(12) United States Patent
Park

(10) Patent No.: US 11,647,461 B2
(45) Date of Patent: *May 9, 2023

(54) METHOD AND DEVICE FOR TRANSMITTING PPDU

(71) Applicant: SAMSUNG ELECTRONICS CO., LTD., Suwon-si (KR)

(72) Inventor: Jong Hoon Park, Namyangju (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 48 days.

This patent is subject to a terminal disclaimer.

(21) Appl. No.: 17/388,334

(22) Filed: Jul. 29, 2021

(65) Prior Publication Data
US 2021/0360525 A1  Nov. 18, 2021

Related U.S. Application Data

(63) Continuation of application No. 16/740,230, filed on Jan. 10, 2020, now Pat. No. 11,102,721, which is a continuation of application No. 15/821,639, filed on Nov. 22, 2017, now Pat. No. 10,575,249.

(30) Foreign Application Priority Data

Nov. 22, 2016 (KR) .................. 10-2016-0155495
Nov. 24, 2016 (KR) .................. 10-2016-0157322
Dec. 7, 2016 (KR) .................. 10-2016-0165637
Dec. 12, 2016 (KR) .................. 10-2016-0168422

(51) Int. Cl.
*H04W 84/12* (2009.01)
*H04W 52/02* (2009.01)
*H04W 72/1268* (2023.01)
*H04W 74/00* (2009.01)
*H04W 74/08* (2009.01)
*H04L 27/26* (2006.01)
*H04W 72/0446* (2023.01)

(52) U.S. Cl.
CPC ..... *H04W 52/0216* (2013.01); *H04L 27/2603* (2021.01); *H04W 52/0229* (2013.01); *H04W 72/1268* (2013.01); *H04W 74/002* (2013.01); *H04W 74/0808* (2013.01); *H04W 74/0816* (2013.01); *H04W 72/0446* (2013.01); *H04W 84/12* (2013.01); *Y02D 30/70* (2020.08)

(58) Field of Classification Search
CPC ..... H04L 12/28; H04L 12/50; H04L 27/2603; H04W 24/04; H04W 52/0216; H04W 52/0229
USPC ................................. 270/329, 401
See application file for complete search history.

(56) References Cited

U.S. PATENT DOCUMENTS

2018/0323901 A1  11/2018 Seok
2022/0174691 A1* 6/2022 Xia .................. H04W 72/0446

* cited by examiner

*Primary Examiner* — Dang T Ton
(74) *Attorney, Agent, or Firm* — Broadview IP Law, PC

(57) ABSTRACT

A method for transmitting a physical layer protocol data unit (PPDU) and a device using the same are provided. The device receives a trigger frame for requesting a transmission of a high efficiency (HE) trigger-based (TB) PPDU and transmits the HE TB PPDU. A duration of the HE TB PPDU is calculated based on a duration of the trigger frame.

22 Claims, 14 Drawing Sheets

METHOD AND DEVICE FOR TRANSMITTING PPDU

CROSS REFERENCE TO RELATED APPLICATIONS

This application is a continuation of U.S. patent application Ser. No. 16/740,230, filed on Jan. 10, 2020, which is a continuation of U.S. patent application Ser. No. 15/821,639, filed on Nov. 22, 2017, which issued as U.S. Pat. No. 10,575,249 on Feb. 25, 2020, and claims the benefit of priority of Korean Patent Application Nos. 10-2016-0155495 filed on Nov. 22, 2016, 10-2016-0157322 filed on Nov. 24, 2016, 10-2016-0165637 filed on Dec. 7, 2016, and 10-2016-0168422 filed on Dec. 12, 2016, which are incorporated by reference as if fully set forth.

FIELD OF INVENTION

The present invention relates to wireless communication and, more particularly, to a method and device for transmitting a data unit in a wireless local area network.

BACKGROUND

Institute of Electrical and Electronics Engineers (IEEE) 802.11 based wireless local area networks (WLANs), the most popular and successful indoor wireless solutions, have evolved as a key enabling technology to cover medium to large scale enterprises, public area hot-spots, apartment complexes, and are ubiquitous in the modern world.

High Efficiency (HE) WLAN (e.g., IEEE 802.11ax) improves a spectrum efficiency and an area throughput in a dense environment. Especially, in an indoor or an outdoor environment, a purpose of the HE WLAN is to improve a performance when a lot of access points (APs) and stations (STAs) are competing.

Since a lot of APs and STAs are competing, an improved protection mechanism to prevent a collision due to simultaneous transmissions of STAs is required.

SUMMARY

The present invention provides a method and device for transmitting a physical layer protocol data unit (PPDU) in a wireless local area network is provided.

In an aspect, the method includes receiving a trigger frame for requesting a transmission of a response PPDU, the trigger frame includes a first duration field, a length field and a resource allocation field, the resource allocation field indicating a resource allocated to the transmission of the response PPDU, and transmitting the response PPDU as a response to the trigger frame. The response PPDU includes a second duration field, the second duration field being set to a value obtained by D1-D2. D1 is a value obtained from the first duration field of the trigger frame. D2 is a value obtained by:

$$SIFS + \left\lceil \frac{LENGTH+3}{3} \right\rceil \cdot 4 + 20 + SignalExtension$$

where Short Interframe Space (SIFS) is 10 microseconds (μs) or 16 μs, LENGTH is a value of the length field in the trigger frame and SignalExtension is 0 μs or 6 μs.

In another aspect, a device includes a transceiver configured to receive and transmit radio signals, and a processor coupled with the transceiver. The processor is configured to control the transceiver to receive a trigger frame for requesting a transmission of a response PPDU, the trigger frame includes a first duration field, a length field and a resource allocation field, the resource allocation field indicating a resource allocated to the transmission of the response PPDU, and control the transceiver to transmit the response PPDU as a response to the trigger frame.

DETAILED DESCRIPTION OF THE PREFERRED EMBODIMENTS

Figure 1:
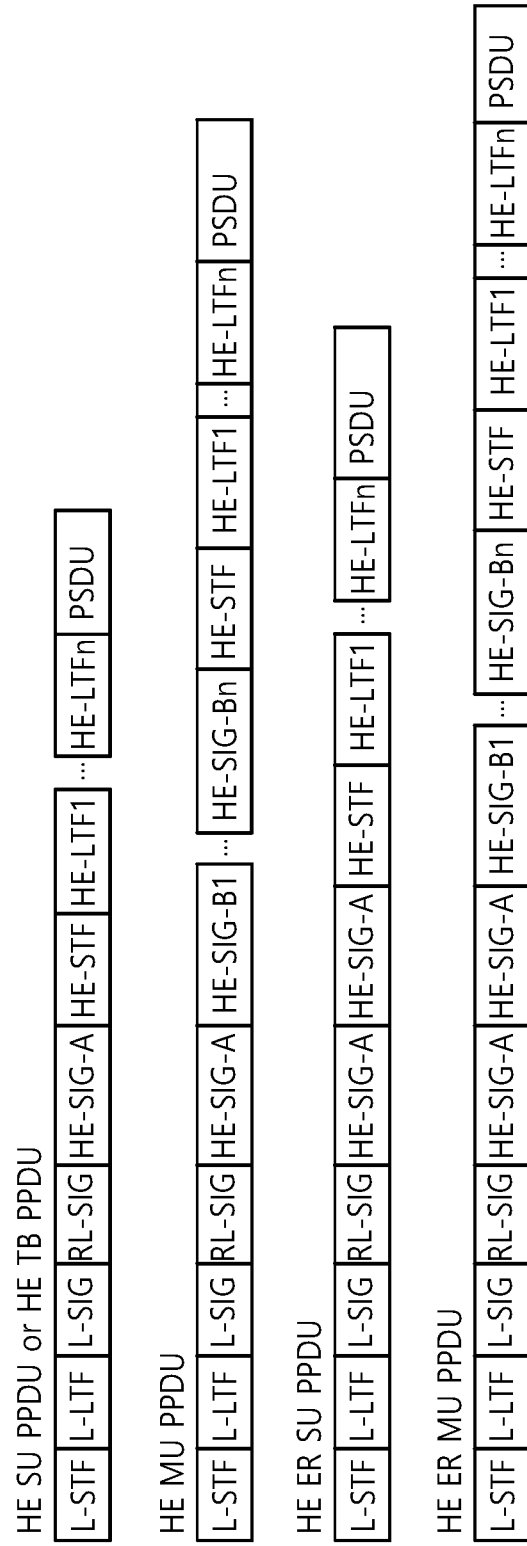
FIG. 1 shows various formats for HE PPDU.

The proposed wireless local area network (WLAN) system may operate at a band less than or equal to 6 GHz or at a band of 60 GHz. The operating band less than or equal to 6 GHz may include at least one of 2.4 GHz and 5 GHz.

For clarity, a system complying with the Institute of Electrical and Electronics Engineers (IEEE) 802.11 a/g standard is referred to as a non-High Throughput (non-HT) system, a system complying with the IEEE 802.11n standard is referred to as a High Throughput (HT) system, and a system complying with IEEE 802.11ac standard is referred to as a Very High Throughput (VHT) system. In comparison thereto, a WLAN system complying with the proposed method is referred to as a High Efficiency (HE) system. A WLAN system supporting systems used before the HE system is released is referred to as a legacy system. The HE system may include an HE Station (STA) and an HE Access Point (AP). The term HE is only for the purpose of distinguishing from the conventional WLAN, and there is no restriction thereon. The HE system may support IEEE 802.11/a/g/n/ac by providing backward compatibility in addition to the proposed method.

Unless a function of a station (STA) is additionally distinguished from a function of an Access Point (AP), the STA may include a non-AP STA and/or the AP. When it is described as an STA-to-AP communication, the STA may be expressed as the non-AP STA, and may correspond to communication between the non-AP STA and the AP. When it is described as STA-to-STA communication or when a function of the AP is not additionally required, the STA may be the non-AP STA or the AP.

A Physical layer Protocol Data unit (PPDU) is a data unit for data transmission. A basic service set (BSS) may include a set of STAs that have successfully synchronized with an AP. A basic service set identifier (BSSID) is a 48 bits identifier of a corresponding BSS. An overlapping basic service set (OBSS) may be a BSS operating on the same channel as the STA's BSS. The OBSS is one example of different BSS with the STA's BSS.

Enhanced Distributed Channel Access (EDCA) channel access protocol is derived from the Distributed Coordination Function (DCF) procedures by adding four independent enhanced distributed channel access functions (EDCAFs) to provide differentiated priorities to transmitted traffic, through the use of four different access categories (ACs).

Each EDCAF shall maintain a backoff timer, which has a value measured in backoff slots. When the backoff procedure is invoked, the backoff timer is set to an integer value chosen randomly with a uniform distribution taking values in the range [0,CW[AC]] inclusive. The duration AIFS[AC] is a duration derived from the value AIFSN[AC] by the relation: AIFS[AC]=AIFSN[AC]×aSlotTime+aSIFSTime.

In an infrastructure BSS, AIFSN[AC] is advertised by an AP in the EDCA Parameter Set element in Beacon and Probe Response frames transmitted by the AP. The value of AIFSN [AC] shall be greater than or equal to 2 for non-AP STAs. The value of AIFSN[AC] shall be greater than or equal to 1 for APs. An EDCA transmission opportunity (TXOP) which is an interval of time during which a STA has the right to initiate frame exchange sequences onto a wireless medium is granted to an EDCAF when the EDCAF determines that it shall initiate the transmission of a frame exchange sequence. Transmission initiation shall be determined according to the following rules:

EDCAF operations shall be performed at slot boundaries, defined as follows on the primary channel, for each EDCAF:

a) Following AIFSN[AC]×aSlotTime−aRxTxTurnaroundTime of idle medium after SIFS (not necessarily idle medium during the SIFS) after the last busy medium on the antenna that was the result of a reception of a frame with a correct FCS.

b) Following EIFS−DIFS+AIFSN[AC]×aSlotTime+aSIFSTime−aRxTxTurnaroundTime of idle medium after the last indicated busy medium as determined by the physical CS mechanism that was the result of a frame reception that has resulted in FCS error, or PHY-RXEND.indication (RXERROR) primitive where the value of RXERROR is not NoError.

c) When any other EDCAF at this STA transmitted a frame requiring acknowledgment, the earlier of 1) the end of the AckTimeout interval timed from the PHY-TXEND.confirm primitive, followed by AIFSN[AC]×aSlotTime+aSIFSTime−aRxTxTurnaroundTime of idle medium, and 2) the end of the first AIFSN[AC]×aSlotTime−aRxTxTurnaroundTime of idle medium after SIFS (not necessarily medium idle during the SIFS, the start of the SIFS implied by the length in the PHY header of the previous frame) when a PHY-RXEND.indication primitive occurs.

d) Following AIFSN[AC]×aSlotTime−aRxTxTurnaroundTime of idle medium after SIFS (not necessarily medium idle during the SIFS) after the last busy medium on the antenna that was the result of a transmission of a frame for any EDCAF and which did not require an acknowledgment.

e) Following AIFSN[AC]×aSlotTime+aSIFSTime−aRxTxTurnaroundTime of idle medium after the last indicated idle medium as indicated by the CS mechanism that is not covered by a) to d).

f) Following aSlotTime of idle medium, which occurs immediately after any of these conditions, a) to f), is met for the EDCAF.

On these specific slot boundaries each EDCAF shall make a determination to perform one and only one of the following functions: Decrement the backoff timer, Initiate the transmission of a frame exchange sequence, Invoke the backoff procedure due to an internal collision and Do nothing.

At each of the above-described specific slot boundaries, each EDCAF shall decrement the backoff timer if the backoff timer for that EDCAF has a nonzero value.

At each of the above-described specific slot boundaries, each EDCAF shall initiate a transmission sequence if there is a frame available for transmission at that EDCAF, and the backoff timer for that EDCAF has a value of 0, and initiation of a transmission sequence is not allowed to commence at this time for an EDCAF of higher UP.

At each of the above-described specific slot boundaries, each EDCAF shall report an internal collision if there is a frame available for transmission at that EDCAF, and the backoff timer for that EDCAF has a value of 0, and initiation of a transmission sequence is allowed to commence at this time for an EDCAF of higher UP.

Each EDCAF shall maintain a state variable CW[AC], which shall be initialized to the value of the parameter CWmin[AC], for that EDCAF's AC.

Transmission failure of an MPDU is defined as follows:

After transmitting an MPDU (even if it is carried in an A-MPDU or as part of a VHT MU PPDU that is sent using TXVECTOR parameter NUM_USERS>1) that requires one or more immediate response:

The STA shall wait for a timeout interval of duration aSIFSTime+aSlotTime+aRxPHYStart-Delay, starting when the MAC receives a PHY-TXEND.confirm primitive. If a PHY-RXSTART.indication primitive does not occur during the timeout interval, the transmission of the MPDU has failed.

If a PHY-RXSTART.indication primitive does occur during the timeout interval, the STA shall wait for the corresponding PHY-RXEND.indication primitive to recognize one or more valid response MPDUs that either does not have a TA field or is sent by one or more recipients of the MPDU requiring a response. If anything else, including any other valid frame, is recognized, the transmission of the MPDU has failed.

The nonfinal (re)transmission of an MPDU that is delivered using the GCR unsolicited retry retransmission policy is defined to be a failure.

In all other cases, the transmission of the MPDU has not failed.

The backoff procedure shall be invoked by an EDCAF when any of the following events occurs:

a) An MA-UNITDATA.request primitive is received that causes a frame with that AC to be queued for transmission such that one of the transmit queues associated with that AC has now become nonempty and any other transmit queues associated with that AC are empty; the medium is busy on the primary channel as indicated by any of the following:
 physical CS;
 virtual CS;
 a non-zero TXNAV timer value;

b) The transmission of the MPDU in the final PPDU transmitted by the TXOP holder during the TXOP for that AC has completed and the TXNAV timer has expired, and the AC was a primary AC.

c) The transmission of an MPDU in the initial PPDU of a TXOP fails and the AC was a primary AC.

d) The transmission attempt collides internally with another EDCAF of an AC that has higher priority, that is, two or more EDCAFs in the same STA are granted a TXOP at the same time.

e) The transmission attempt of a STA coordinated by an MM-SME collides internally with another STA coordinated by the same MM-SME, which is indicated to the first MAC entity with a PHY-TXBUSY.indication(BUSY) primitive as response to the PHY-TXSTART.request primitive.

In addition, the backoff procedure may be invoked by an EDCAF when the transmission by the TXOP holder of an MPDU in a noninitial PPDU of a TXOP fails.

If the backoff procedure is invoked for reason a) above, the value of CW[AC] shall be left unchanged. If the backoff procedure is invoked for reason b) above, the value of CW[AC] shall be reset to CWmin[AC].

If the backoff procedure is invoked for reason c), d), e) or f) above, or the transmission failure of a non-initial frame by the TXOP holder], the value of CW[AC] shall be updated as follows before invoking the backoff procedure:

If the QSRC[AC] or the QLRC[AC] has reached dot11ShortRetryLimit or dot11LongRetryLimit respectively, CW[AC] shall be reset to CWmin[AC].

If dot11RobustAVStreamingImplemented is true and either the QSDRC[AC] or the QLDRC[AC] has reached dot11ShortDEIRetryLimit or dot11LongDEIRetryLimit, respectively, CW[AC] shall be reset to CWmin[AC].

Otherwise,

If CW[AC] is less than CWmax[AC], CW[AC] shall be set to the value (CW[AC]+1)×2−1.

If CW[AC] is equal to CWmax[AC], CW[AC] shall be left unchanged.

For an HE STA, if CW[AC] is less than CWmin [AC], CW[AC] shall be set to CWmin [AC].

For an HE STA, if CW[AC] is greater than CWmax[AC], CW[AC] shall be set to CWmax[AC].

Regarding the CW[AC] update, the last two sub-bullets on the above rules are happened when the EDCA parameter set is changed.

For an HE STA, if CW[AC] is less than CWmin [AC], CW[AC] shall be set to CWmin [AC].

For an HE STA, if CW[AC] is greater than CWmax[AC], CW[AC] shall be set to CWmax[AC].

Physical and virtual Carrier sense (CS) functions are used to determine the state of the wireless medium. When either function indicates a busy medium, the medium shall be considered busy; otherwise, it shall be considered idle.

A physical CS mechanism shall be provided by the physical layer (PHY). A virtual CS mechanism shall be provided by the Medium Access Control (MAC) layer. This mechanism is referred to as the network allocation vector (NAV). The NAV maintains a prediction of future traffic on the medium based on duration information that is announced in Request-to-Send (RTS)/Clear-to-Send (CTS) frames prior to the actual exchange of data. The duration information is also available in the MAC headers of all frames sent during the contention period other than PS-Poll frames.

The CS mechanism combines the NAV state and the STA's transmitter status with physical CS to determine the busy/idle state of the medium. The NAV may be thought of as a counter, which counts down to 0 at a uniform rate. When the counter is 0, the virtual CS indication is that the medium is idle; when the counter is nonzero, the indication is busy. The medium shall be determined to be busy when the STA is transmitting.

A STA that receives at least one valid frame in a Physical layer Service Data Unit (PSDU) can update its NAV with the information from any valid Duration field in the PSDU. When the received frame's receiver address (RA) is equal to the STA's own MAC address, the STA shall not update its NAV. For all other received frames the STA shall update its NAV when the received Duration is greater than the STA's current NAV value. Upon receipt of a PS-Poll frame, a STA shall update its NAV settings as appropriate under the data rate selection rules using a duration value equal to the time, in microseconds, required to transmit one Ack frame plus one SIFS, but only when the new NAV value is greater than the current NAV value. If the calculated duration includes a fractional microsecond, that value is rounded up to the next higher integer. Various additional conditions may set or reset the NAV. When the NAV is reset, a PHY-CCARESET.request primitive shall be issued. This NAV update operation is performed when the PHY-RXEND.indication primitive is received.

The PHY-RXSTART.indication primitive is an indication by the PHY to the local MAC entity that the PHY has received a valid start of a PPDU, including a valid PHY header. This primitive is not generated until the PHY has determined the PPDU format. The RXVECTOR of the PHY-RXSTART.indication represents a list of parameters that the PHY provides the local MAC entity upon receipt of a valid PHY header.

After generating a PHY-RXSTART.indication primitive, the PHY is expected to maintain physical medium busy status (not generating a PHY-CCA.indication (IDLE) primitive) during the period required by that PHY to transfer a frame of the indicated LENGTH at the indicated DATARATE. This physical medium busy condition should be maintained even if a PHY-RXEND.indication (CarrierLost) primitive or a PHY-RXEND.indication(FormatViolation) primitive is generated by the PHY prior to the end of this period.

The PHY-RXEND.indication primitive is an indication by the PHY to the local MAC entity that the PSDU currently being received is complete. The PHY-RXEND.indication primitive has two parameters: RXERROR and RXVECTOR.

The RXERROR parameter of the PHY-RXEND.indication primitive can convey NoError or one or more values indicating an error condition. A number of error conditions may occur after the PHY's receive state machine has detected what appears to be a valid preamble and SFD. The following describes the parameter returned for each of those error conditions.

NoError: This value is used to indicate that no error occurred during the receive process in the PHY.

FormatViolation: This value is used to indicate that the format of the received PPDU was in error.

CarrierLost: This value is used to indicate that during the reception of the incoming PSDU, the carrier was lost and no further processing of the PSDU can be accomplished.

UnsupportedRate: This value is used to indicate that during the reception of the incoming PPDU, a nonsupported date rate was detected.

Filtered: This value is used to indicate that during the reception of the PPDU, the PPDU was filtered out due to a condition set in the PHYCONFIG_VECTOR.

The RXVECTOR of the PHY-RXEND.indication primitive represents a list of parameters that the PHY provides the local MAC entity upon receipt of a valid PHY header or upon receipt of the last PSDU data bit in the received frame. RXVECTOR is an included parameter only when dot11RadioMeasurementActivated is true. This vector may contain both MAC and MAC management parameters.

The PHY-RXEND.indication primitive is generated by the PHY for the local MAC entity to indicate that the receive state machine has completed a reception with or without errors. When a Signal Extension is present, the primitive is generated at the end of the Signal Extension. In the case of an RXERROR value of NoError, the MAC uses the PHY-RXEND.indication primitive as reference for channel access timing. The effect of receipt of this primitive is for the MAC to begin inter-frame space processing.

FIG. 1 shows various formats for HE PPDU.

HE single user (SU) PPDU, HE trigger-based (TB) PPDU and HE extended range (ER) SU PPDU format are destined for a single STA. HE multi-user (MU) PPDU and HE ER MU PPDU are destined for the plurality of STAs.

HE PPDU may include Non-HT Short Training field (L-STF), Non-HT Long Training field (L-LTF), Non-HT SIGNAL field (L-SIG), Repeated Non-HT SIGNAL field (RL-SIG), HE Signal A field (HE-SIG-A), HE Signal B field (HE-SIG-A), HE Short Training field (HE STF), HE Long Training field (HE LTF) and a Data field. The Data field may include a Physical layer service data unit (PSDU).

The L-SIG is used to communicate rate and length information. The L-SIG may include a LENGTH field and a RATE field. The RATE field may be set to the value representing 6 Mb/s in the 20 MHz channel. The LENGTH field may be set to the value given by the following equation:

$$LENGTH = \left\lceil \frac{TXTIME - SignalExtension - 20}{4} \right\rceil \cdot 3 - 3 - m \quad \text{[Equation 1]}$$

where TXTIME is described later and m is 1 for HE MU PPDU and HE ER SU PPDU, and m is 2 otherwise. SignalExtension may be a time to set NAV correctly and may be 0-10 μs. For example, SignalExtension may be 0 μs or 6 μs. SignalExtension may be 0 μs when TXVECTOR parameter NO_SIG_EXTN is true and aSignalExtension when TXVECTOR parameter NO_SIG_EXTN is false. aSignalExtension may be 0 μs when operating in the 5 GHz band 6 μs when operating in the 2.4 GHz band.

The HE-SIG-A may include at least one of following fields. The number of bits is exemplary purpose only.

TABLE 1

| Field | Number of bits | Description |
| --- | --- | --- |
| UL/DL | 1 | Indicates whether the PPDU is sent UL or DL: i.e. Set to 0 for DL, Set to 1 for UL |
| Format | 1 | Differentiate an HE SU PPDU from an HE TB PPDU: i.e. Set to 0 for HE TB PPDU, Set to 1 for HE SU PPDU |
| BSS Color | 6 | The BSS Color field is an identifier of the BSS |
| Bandwidth | 2 | Bandwidth over which this PPDU is transmitted. |
| Modulation and Coding Scheme (MCS) | | Indicated a MCS of the Data Field |
| TXOP Duration | | Indicates the remaining duration of the TXOP after the transmission. Set to a value to indicate duration information for NAV setting and protection of the TXOP. |
| Spatial Reuse | | Indicates whether or not spatial reuse is allowed during the transmission of this PPDU, and if allowed, indicates a value that is used to determine a limit on the transmit power of a spatial reuse transmission. |

Table 2 shows timing related constants of HE PPDU

TABLE 2

| Parameter | Values | Description |
| --- | --- | --- |
| $T_{SYM}$ | 13.6 μs, 14.4 μs or 14.4 μs depending on the GI used | Symbol interval |
| $T_{L-STF}$ | 8 μs | Non-HT Short Training field duration |
| $T_{L-LTF}$ | 8 μs | Non-HT Long Training field duration |
| $T_{L-SIG}$ | 4 μs | Non-HT SIGNAL field duration |
| $T_{RL-SIG}$ | 4 μs | Repeated non-HT SIGNAL field duration |
| $T_{HE-SIG-A}$ | 8 μs | HE Signal A field duration in normal mode |
| $T_{HE-SIG-A-R}$ | 8 μs | HE Signal A field duration in repetition/low rate mode |
| $T_{HE-STF-T}$ | 8 μs = 5 × 1.6 μs | HE Short Training field duration for trigger-based PPDU |
| $T_{HE-STF-NT}$ | 4 μs = 5 × 0.8 μs | HE Short Training field duration for non-trigger-based PPDU |

TABLE 2-continued

| Parameter | Values | Description |
|---|---|---|
| $T_{HE-LTF}$ | $T_{HE-LTF-1x}$, $T_{HE-LTF-2x}$ or $T_{HE-LTF-4x}$ depending upon the LTF duration used | Duration of each HE-LTF symbol without GI |
| $T_{HE-LTF-1x}$ | 3.2 μs | Duration of each 1x HE-LTF symbol without GI |
| $T_{HE-LTF-2X}$ | 6.4 μs | Duration of each 2x HE-LTF symbol without GI |
| $T_{HE-LTF-4X}$ | 12.8 μs | Duration of each 4x HE-LTF symbol without GI |
| $T_{HE-SIG-B}$ | 4 μs = 3.2 μs + $T_{GI, Pre-HE}$ | Duration of each HE-SIG-B symbol |
| $T_{PE}$ | 0, 4 μs, 8 μs, 12 μs, 16 μs depending on actual extension duration used | Duration of Packet Extension field |
| $N_{service}$ | 16 | Number of bits in the SERVICE field |
| $N_{tail}$ | 6 | Number of tail bits per BCC encoder |

The value of the TXTIME parameter may be calculated for an HE PPDU using the following:

$$TXTIME=20+T_{HE-PREAMBLE}+N_{SYM}T_{SYM}+T_{PE}+\text{SignalExtension} \quad \text{[Equation 2]}$$

where $T_{HE-PREAMBLE}=T_{RL-SIG}+T_{HE-SIG-A}+T_{HE-STF-T}+N_{HE-LTF}$ $T_{HE-LTF,SYM}$ for HE TB PPDU, $T_{HE-PREAMBLE}=T_{RL-SIG}+T_{HE-SIG-A}+T_{HE-STF-NT}+N_{HE-LTF}$ $T_{HE-LTF,SYM}$ for HE SU PPDU, $T_{HE-PREAMBLE}=T_{RL-SIG}+T_{HE-SIG-A}+N_{HE-SIG-B}$ $T_{HE-SIG-B}+T_{HE-STF-NT}+N_{HE-LTF}$ $T_{HE-LTF,SYM}$ for HE MU PPDU, $T_{HE-PREAMBLE}=T_{RL-SIG}+T_{HE-SIG-A}+T_{HE-SIG-A-R}+T_{HE-STF-NT}+N_{HE-LTF}$ $T_{HE-LTF,SYM}$ for HE ER SU PPDU, $N_{HE-LTF}$ is the number of OFDM symbols in the HE-LTF field, $T_{SYM}=4$ μs, $$N_{SYM} = \left\lceil \left( \frac{LENGTH + m + 3}{3} \times 4 - T_{HE-PREAMBLE} \right) / T_{SYM} \right\rceil - b_{PE-Disambiguity},$$

$$\text{and } T_{PE} = \left\lceil \left\{ \left( \frac{LENGTH + m + 3}{3} \times 4 - T_{HE-PREAMBLE} \right) - N_{SYM} T_{SYM} \right\} / 4 \right\rceil \times 4.$$

$b_{PE-Disambiguity}$ is the value indicated by a sub-field of the HE-SIG-A field. Especially, $b_{PE-Disambiguity}$ is derived from the Packet Extension subfield of the Common Info field in a Trigger frame when the transmitted PPDU is an HE TB PPDU.

The value of the RXTIME may be calculated for an HE PPDU using the following:

$$RXTIME=20+T_{HE-PREAMBLE}+N_{SYM}T_{SYM}+T_{PE}+\text{SignalExtension} \quad \text{[Equation 3]}$$

Figure 2:
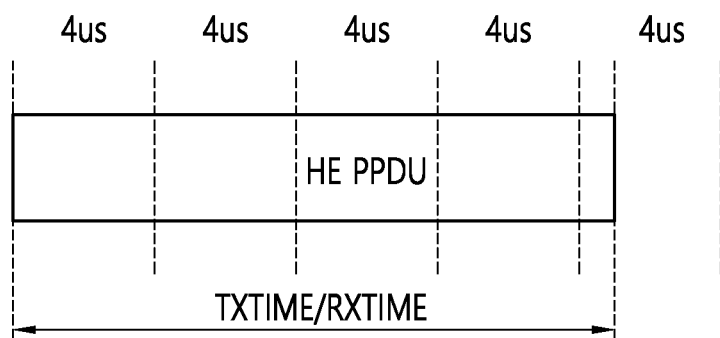
FIG. 2 shows a boundary of a PPDU.

FIG. 2 shows a boundary of a PPDU.

TXTIME and RXTIME of HE PPDU represents the actual used time for a transmission and a reception. So, as shown the below figure, TXTIME and RXTIME of HE PPDU is not aligned with 4 μs boundary.

Figure 3:
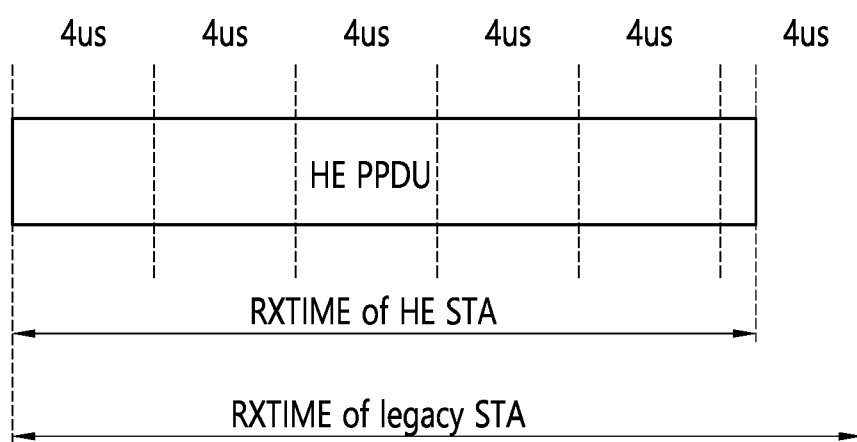
FIG. 3 shows the difference of RXTIME between HE STA and legacy STA.FIG.

FIG. 3 shows the difference of RXTIME between HE STA and legacy STA.

When a legacy STA (such as, non-HT STA, HT STA and VHT STA) receives HE PPDU, the RXTIME is calculated as the following, based on the LENGTH subfield of L-SIG field of the HE PPDU.

$$RXTIME = \left\lceil \frac{LENGTH + 3}{3} \right\rceil \cdot 4 + 20 + SignalExtension \quad \text{[Equation 4]}$$

A protection mechanism of a HE STA is that this NAV update operation is performed when the PHY-RXEND.indication primitive is received, except when the PHY-RXEND.indication primitive is received before the end of the PPDU, in this case, this NAV update operation is performed at the expected end of the PPDU. The expected end of the PPDU is calculated by Equation 3 when the received PPDU is an HE SU PPDU, HE extended range SU PPDU or HE MU PPDU. The expected end of the PPDU is calculated as the Equation 4 when the received PPDU is HE TB PPDU.

For indicating the expected end of the PPDU for updating the NAV, a PHY-TXOP.indication primitive is defined. The PHY-TXOP.indication primitive is an indication by the PHY to the local MAC entity of the remaining TXOP duration after a reception. The PHY-TXOP.indication primitive provides TXOP_DURATION. The TXOP_DURATION parameter is set to a value indicated in the TXOP Duration field of HE-SIG-A from the received HE PPDU.

In TXVECTOR, TXOP_DURATION indicates a duration of time that is used to update the NAV for this TXOP, except for a value of 127 (i.e., all 1 s) which indicates an invalid value of TXOP duration in the HE-SIG-A field. In RXVECTOR, TXOP_DURATION indicates the remaining duration of the TXOP after the reception. TXOP_DURATION may has B0-B6 bits. B0 indicates whether the granularity is 8 μs or 128 μs. When B0 is 0, then B1 to B6 indicate a duration, in units of 8 μs, starting from 0 to 504 us (i.e, duration=(8 μs×value of (B1-B6)) μs). When B0 is 1, then B1 to B6 indicate a duration, in units of 128 μs, starting from 512 μs until 8448 μs (i.e, duration=(512+128×value of (B1-B6)) μs).

Figure 4:
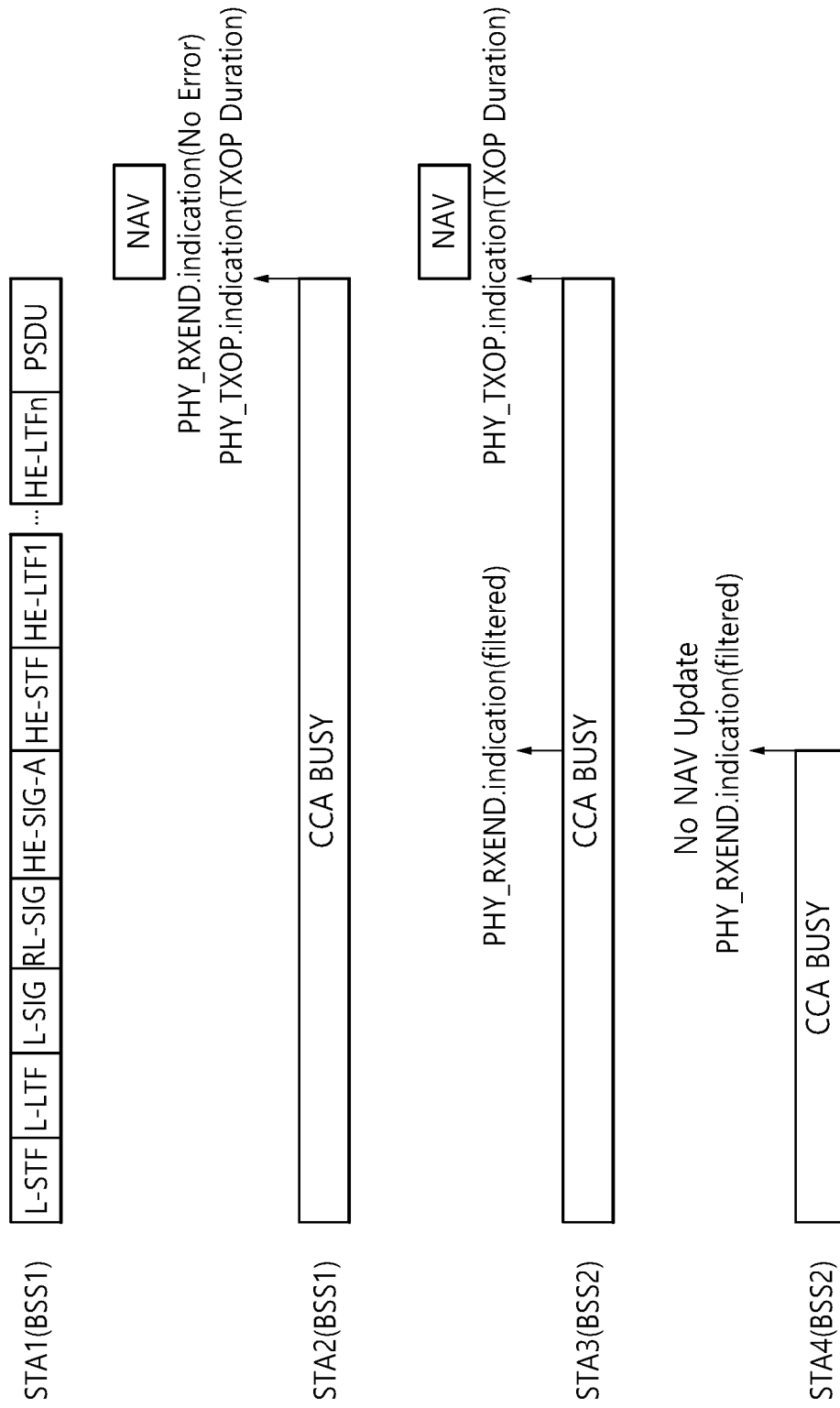
FIG. 4 shows the NAV procedure of HE STA after receiving HE PPDU.

FIG. 4 shows the NAV procedure of HE STA after receiving HE PPDU.

In STA 2, because PHY-RXEND.indication primitive and PHY-TXPOP.indication primitive are occurred at the end of the PSDU, the NAV is set to either TXOP Duration value indicated in HE-SIG-A or Duration value indicated in MAC header.

In a case of STA 3, after decoding HE-SIG-A, it knows that the received PPDU is destined to OBSS STA. So, it discards the remaining PSDU. In consequence, PHY-RXEND.indication primitive is occurred after HE-SIG-A for a power saving purpose. But, for a protection mechanism, PHY-TXOP.indication primitive is occurred at the end of the RXTIME. The NAV of STA 3 is set to TXOP Duration value obtained from PHY-TXOP.indication primitive.

In STA 4, after decoding HE-SIG-A, it knows that the received PPDU is destined to OBSS STA. But, because the received signal strength is less than OBSS Packet Detection (OBSS PD) Threshold, it ignores the NAV update and resumes its backoff procedure. PHY-TXOP.indication primitive is not occurred or is occurred with RXVECTOR parameter TXOP_DURATION set to 0.

Figure 5:
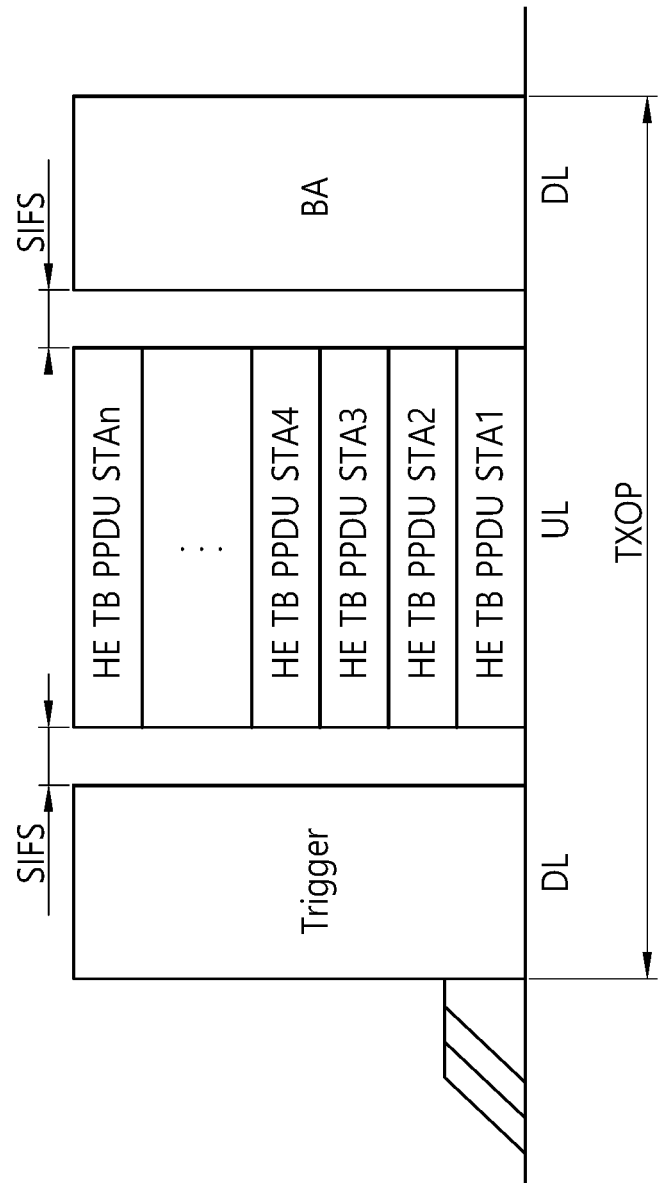
FIG. 5 shows an example of uplink multi-user operation.

FIG. 5 shows an example of uplink multi-user operation.

The UL MU operation allows an AP to solicit simultaneous immediate response frames from one or more non-AP STAs. Non-AP STAs transmit their response frames using HE TB PPDU, in either UL OFDMA, UL MU-MIMO, or both.

An AP transmits a Trigger frame to a plurality of recipient STAs. The Trigger frame requests a transmission of HE TB PPDU. The Trigger frame solicits and allocates resources for UL MU transmissions a SIFS after the PPDU that carries the Trigger frame. The Trigger frame may include one or more User Info fields addressed to the recipient STAs. The inter frame space between a PPDU that contains a Trigger frame and the HE TB PPDU is SIFS. If a Trigger frame is aggregated with other frames in an Aggregated-MAC Protocol Data Unit (A-MPDU), the Trigger frame shall be the first frame in the A-MPDU.

An AP does not set any subfields of the Common Info field to a value that is not supported by all the recipient STAs of the Trigger frame. An AP shall not set any subfields of a User Info field to a value that is not supported by the recipient STAs of the User Info field.

A recipient STA may commence the transmission of an HE TB PPDU at the SIFS time boundary after the end of a received PPDU, when the received PPDU contains a Trigger frame with a User Info field addressed to the recipient STA. The User Info field is addressed to a STA if the User Identifier subfield is equal to the association identifier (AID) of the STA and the STA is associated with the AP.

After receiving a plurality of HE TB PPDUs from the plurality of STAs, the AP may transmits a block acknowledgement (BA) frame for acknowledging the plurality of HE TB PPDUs to the plurality of recipient STAs.

Figure 6:
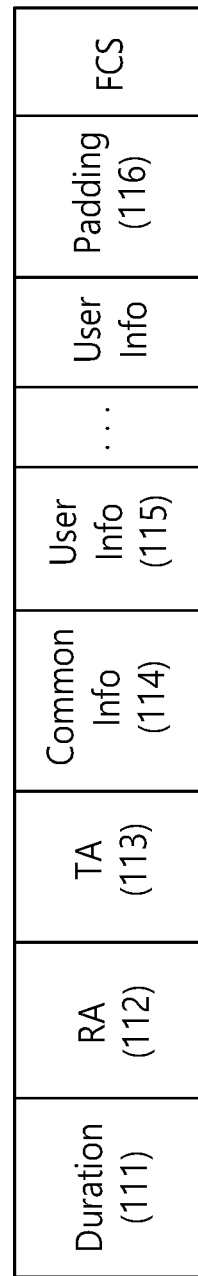
FIG. 6 shows a format of Trigger frame.

FIG. 6 shows a format of Trigger frame.

A Duration field 111 is set to the remaining duration of the TXOP. The Duration field 111 may be set to the estimated time required to transmit the solicited HE TB PPDU, plus the estimated time required to transmit the acknowledgement for the solicited HE TB PPDU, plus applicable SIFSs.

A receiver address (RA) field 112 is the address of the recipient STA. A transmitter address (TA) field 113 is the address of the STA transmitting the Trigger frame. A Padding field 116 extends the frame length to give the recipient STAs more time to prepare a response.

A Common Info field 114 may include at least one of following subfields in the Table 3. The number of bits is exemplary purpose only.

TABLE 3

| Subfields | Bits | Description |
|---|---|---|
| Trigger Type | 4 | indicates the type of the Trigger frame. |
| Length | 12 | indicates the value of the L-SIG Length field of the HE TB PPDU that is the response to the Trigger frame |
| CS required | 1 | Set to 1 to indicate that the STAs identified in the User Info fields are required to sense the medium and to consider the medium state and the NAV in determining whether or not to respond. The CS Required subfield is set to 0 to indicate that the STAs identified in the User Info fields are not required to consider the medium state or the NAV in determining whether or not to respond. |

TABLE 3-continued

| Subfields | Bits | Description |
|---|---|---|
| Bandwidth | 2 | indicates the bandwidth in the HE-SIG-A of the HE TB PPDU. E.g. 20 MHz, 40 MHz, 80 MHz, 80 + 80 MHz or 160 MHz |
| GI And LTF Type | 2 | indicates the GI and HE-LTF type of the HE TB PPDU response. |

The Trigger Type subfield indicates the type of the Trigger frame. The Trigger Type subfield encoding is defined in the below.

TABLE 4

| Trigger Type field value | Description |
|---|---|
| 0 | Basic Trigger |
| 1 | Beamforming Report Poll Trigger |
| 2 | MU-BAR |
| 3 | MU-RTS |
| 4-15 | Reserved |

The Trigger frame may include one or more User Info fields 115 addressed to the recipient STAs. For recipient STAs that are associated with the AP, the User Info field is addressed to a recipient STA if the value of the User Identifier subfield of the User Info field is equal to the AID of the STA.

The User Info field 115 may include at least one of following subfields in the Table 5.

TABLE 5

| Subfields | Bits | Description |
|---|---|---|
| AID | 12 | indicates the AID of the STA allocated the resource unit (RU) to transmit the MPDU(s) in the HE TB PPDU, except for an AID equal to 0 which identifies a wildcard RU for random access. |
| RU allocation | 8 | indicates the RU used by the HE TB PPDU of the STA identified by the User Identifier subfield. |
| Coding Type | | indicates the code type of the HE TB PPDU response of the STA identified by the User Identifier subfield. |
| MCS | | indicates the MCS of the HE TB PPDU response of the STA identified by the User Identifier subfield. |
| DCM | | indicates dual carrier modulation of the HE TB PPDU response of the STA identified by the User Identifier subfield. |
| Spatial Stream allocation | | indicates the spatial streams of the HE TB PPDU response of the STA identified by User Identifier field. |

Figure 7:
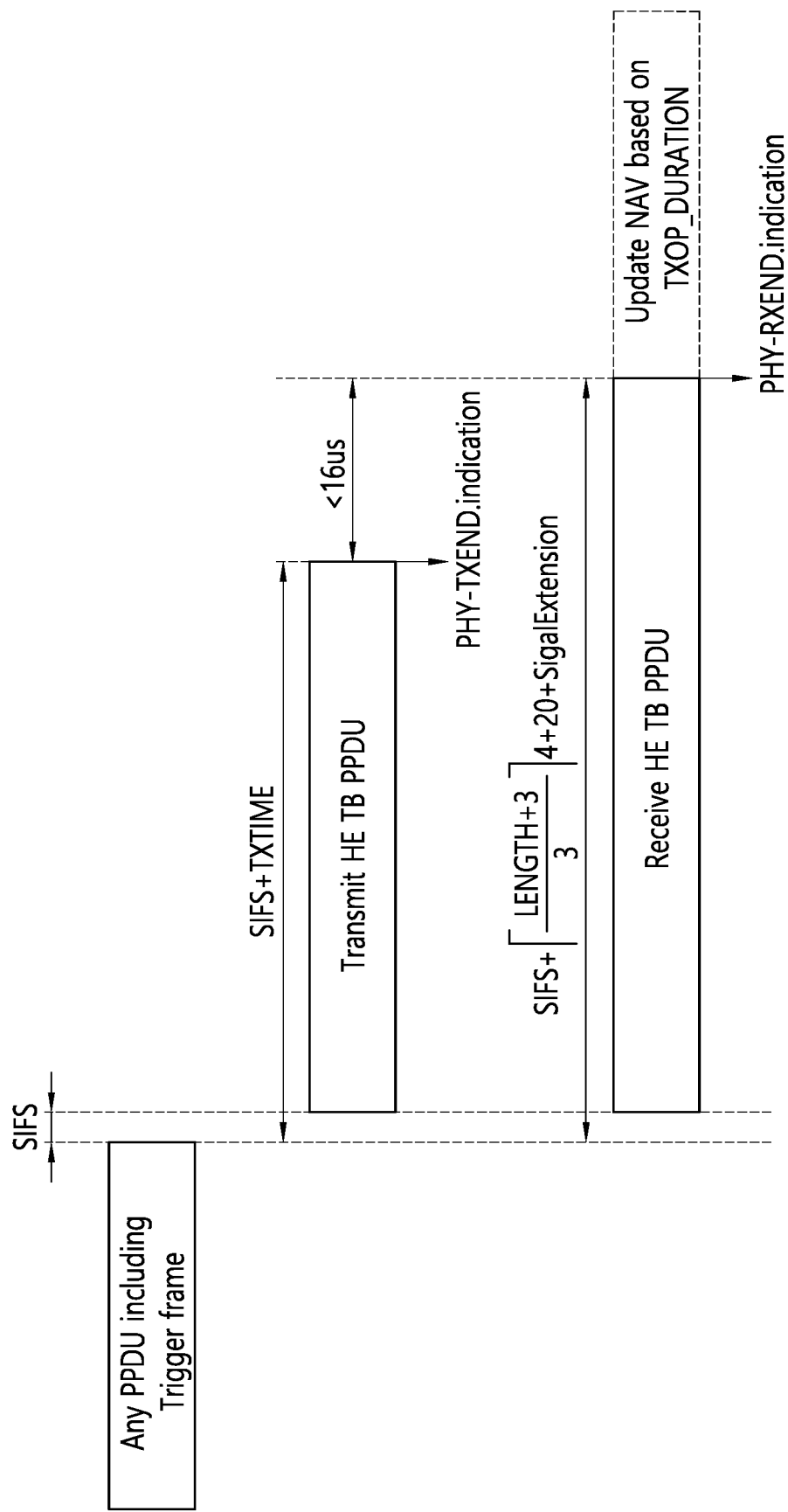
FIG. 7 shows a protection when HE TB PPDU is transmitted.

FIG. 7 shows a protection when HE TB PPDU is transmitted.

The Length subfield of the Common Info field in the Trigger frame indicates the value of the L-SIG Length field of the HE TB PPDU that is the response to the Trigger frame. The Length subfield may be set to a positive value that satisfies the following constraints: LENGTH mod 3=1 and $$\left\lceil \frac{LENGTH + 3}{3} \right\rceil \cdot 4 + 20 + SignalExtension - TXTIME < 4\ \mu s,$$

where TXTIME is an actual transmission time of an HE TB PPDU that is defined in Equation 2. If the Length subfield does not satisfy the above constraints, the 3rd party STA can be over-protected for at most 16 μs as shown in FIG. 7.

The CS Required subfield of the Trigger frame is set to 1 to indicate that the STAs identified in the User Info fields are required to use ED to sense the medium and to consider the medium state and the NAV in determining whether or not to respond. The CS Required subfield is set to 0 to indicate that the STAs identified in the User Info fields are not required to consider the medium state or the NAV in determining whether or not to respond. The ED-based CCA and virtual CS functions are used to determine the state of the medium if CS is required before responding to a received Trigger frame.

A NAV is considered in virtual CS for a STA that is solicited by a Trigger frame for transmission unless one of the following conditions is met:

The response generated by the STA contains an Ack frame or a BlockAck frame and the Length subfield in the Common Info field of the Trigger frame is less than or equal to 418

The NAV was set by an intra-BSS frame

If one or both of the NAVs are considered and the considered NAV's counter is nonzero, then the virtual CS indicates busy. Otherwise, the virtual CS is idle.

If the CS Required subfield in a Trigger frame is set to 1, the STA shall consider the status of the CCA and the virtual carrier sense (NAV) before UL MU transmission in response to the Trigger frame. In this case, the STA shall sense the medium using energy-detect (ED) after receiving the PPDU that contains the Trigger frame (i.e. during the SIFS time), and it shall perform the ED at least in the subchannel that contains the STA's UL allocation, where the sensed subchannel consists of either a single 20 MHz channel or multiple of 20 MHz channels. The STA may transmit an HE TB PPDU when the 20 MHz channels containing the allocated RUs in the Trigger frame are considered idle; if the STA detects that the 20 MHz channels containing the allocated RUs are not all idle, then the STA shall not transmit anything in the allocated RUs.

If the CS Required subfield in a Trigger frame is set to 0 or an UL MU response scheduling A-Control field is included in the received (A-)MPDU that solicits a response, the STA may respond with an HE TB PPDU without regard to the busy/idle state of the medium.

The AP may set the CS Required subfield to 1 except when the AP solicits an Ack or BlockAck frame from all scheduled HE TB PPDUs and the Length subfield in the Common Info field of the Trigger frame is less than or equal to 418.

If the STA receives a Trigger frame having the CS Required subfield set to 0 but it does not receive any other frame soliciting an Ack frame or a BlockAck frame, the STA does not respond with an HE TB PPDU.

Figure 8:
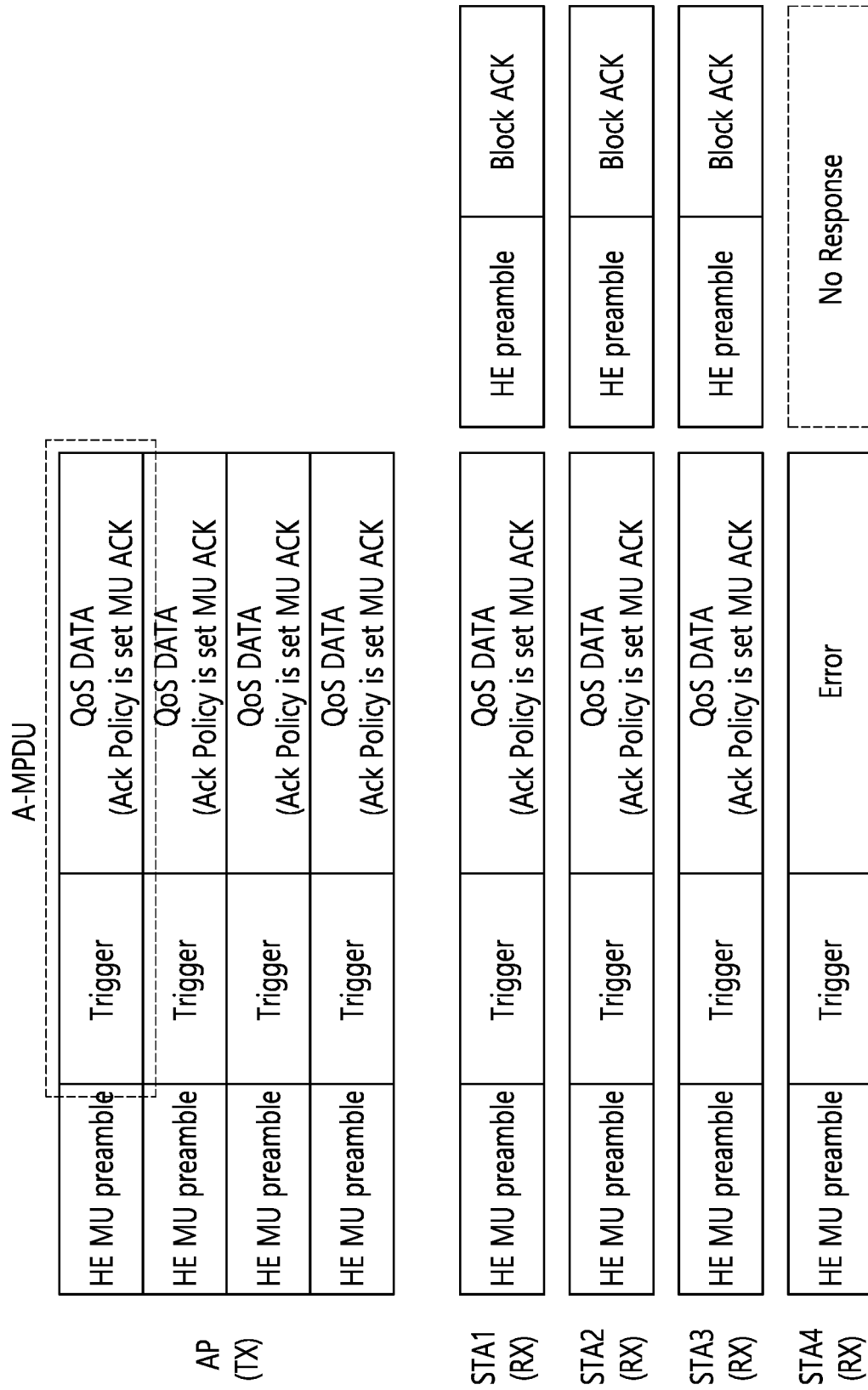
FIG. 8 shows an example of MU UL transmission.

FIG. 8 shows an example of MU UL transmission.

An AP transmits a HE MU PPDU for STA1, STA2, STA3 and STA4. A trigger frame contained in the HE MU PPDU has the CS Required subfield set to 0. The STA1, STA2 and STA3 receive both the Trigger frame having the CS Required subfield set to 0 and any other frame (i.e., QoS DATA frame with Ack Policy set to MU ACK) soliciting an Ack frame or a BlockAck frame. So, the STA1, STA2 and STA3 respond with an HE trigger-based PPDU that carries Block ACK frame. However, the STA4 receives a Trigger frame having the CS Required subfield set to 0 but it does not receive any other frame soliciting an Ack frame or a BlockAck frame. In such case, the STA4 does not respond with an HE trigger-based PPDU.

However, if the STA received a Trigger frame, it knows its allocated RU for an HE trigger-based PPDU transmission. In such case, responding with an HE trigger-based PPDU (such as QoS Null frame) can be more helpful to for an overall performance.

On this purpose, If the STA receives a Trigger frame having the CS Required subfield set to 0 but it does not receive any other frame soliciting an Ack frame or a BlockAck frame, the STA may respond with an HE trigger-based PPDU (especially that carries an QoS Null fame) when the NAV is idle and the 20 MHz channels containing the allocated RUs in the Trigger frame are considered idle.

Figure 9:
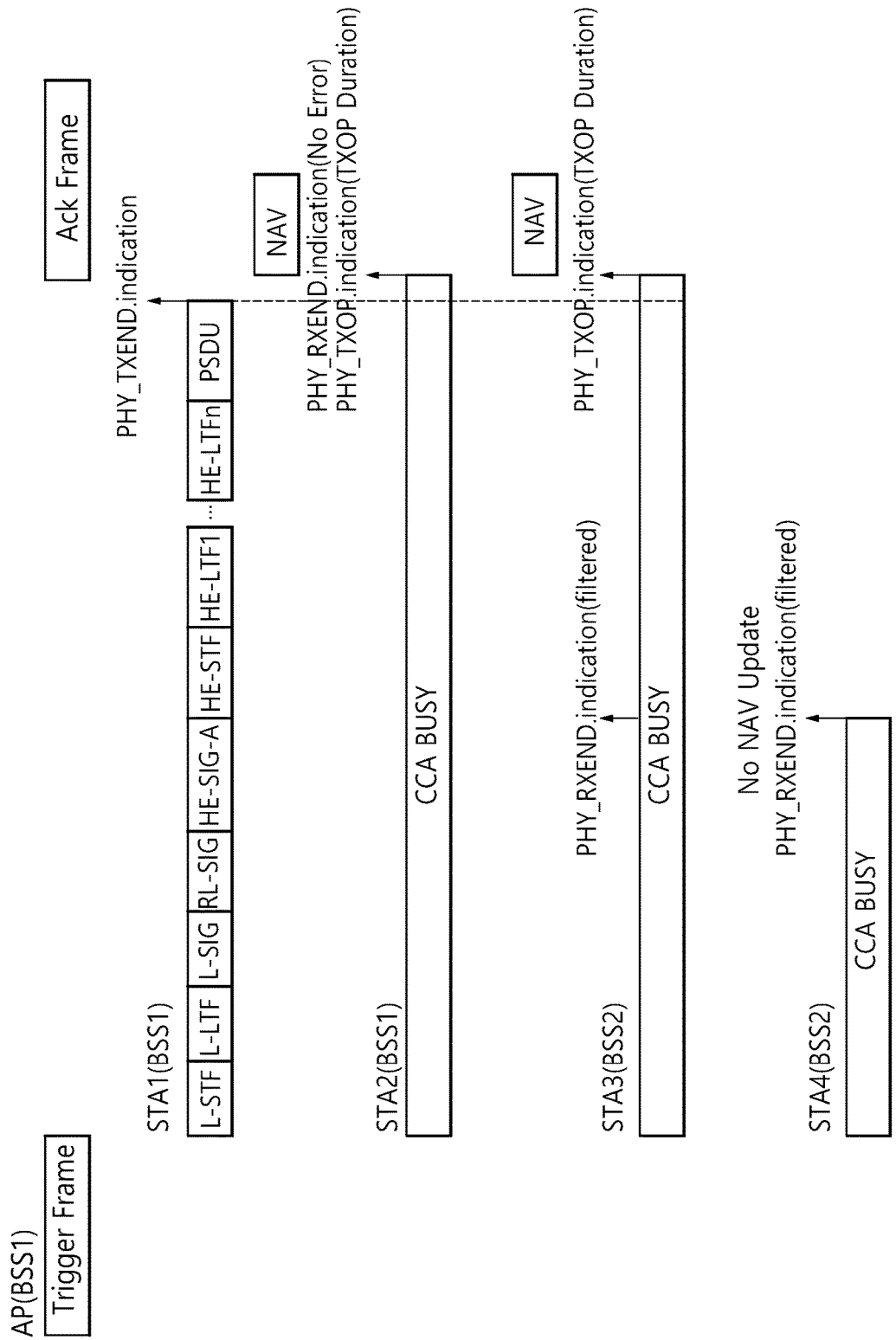
FIG. 9 shows the NAV procedure of HE STA after receiving HE TB PPDU.

FIG. 9 shows the NAV procedure of HE STA after receiving HE TB PPDU.

In STA 2, because PHY-RXEND.indication primitive and PHY-TXOP.indication primitive are occurred at the end of the PSDU, the NAV is set to either TXOP Duration value indicated in HE-SIG-A or Duration value indicated in MAC header.

In a case of STA 3, after decoding HE-SIG-A, it knows that the received PPDU is destined to OBSS STA. So, it discards the remaining PSDU. In consequence, PHY-RXEND.indication primitive is occurred after HE-SIG-A for a power saving purpose. But, for a protection mechanism, PHY-TXOP.indication primitive is occurred at the end of the RXTIME. The NAV of STA 3 is set to TXOP Duration value obtained from PHY-TXOP.indication primitive.

In STA 4, after decoding HE-SIG-A, it knows that the received PPDU is destined to OBSS STA. But, because the received signal strength is less than OBSS Packet Detection (OBSS PD) Threshold, it ignores the NAV update and resumes its backoff procedure. PHY-TXOP.indication primitive is not occurred or is occurred with RXVECTOR parameter TXOP_DURATION set to 0.

Upon receiving the transmitted PHY preamble overlapping the primary 20 MHz channel in a greater than or equal to 20 MHz BSS, the PHY measures a receive signal strength. This activity is indicated by the PHY to the MAC via a PHY-CCA.indication primitive. A PHY-CCA.indication (BUSY, channel-list) primitive is also issued as an initial indication of reception of a signal. The channel-list parameter of the PHY-CCA.indication primitive is absent when the operating channel width is 20 MHz. The channel-list parameter is present and includes the element primary when the operating channel width is 40 MHz, 80 MHz, 160 MHz, or 80+80 MHz.

The PHY does not issue a PHY-RXSTART.indication primitive in response to a PPDU that does not overlap the primary channel, except when the PHY at an AP receives the HE-trigger based PPDU. In such case, the PHY shall issue a PHY-RXSTART.indication primitive in response to a PPDU transmission either at the primary or at the secondary channel.

The PHY includes the most recently measured RSSI value in the PHY-RXSTART.indication(RXVECTOR) primitive issued to the MAC.

After the PHY-CCA.indication(BUSY, channel-list) primitive is issued, the PHY entity shall begin receiving the training symbols and searching for the preambles for NON-HT, HT, VHT, and HE PPDUs, respectively. If the constellation used in the first symbol after the first long training field is QBPSK, the PHY entity shall continue to detect the received signal using the receive procedure for HT-GF. Otherwise, for detecting the HE preamble, the PHY entity shall search for L-SIG and RL-SIG in order to set the maximum duration of the data stream. If RL-SIG is detected, the PHY entity should check the parity bit and RATE fields in L-SIG and RL-SIG. If either the check of the parity bit is invalid or the RATE field is not set to MCS0 in NON-HT, a PHY-RXSTART.indication primitive is not issued. If the check of the parity bit is valid and the RATE field is set to MCS0 but the LENGTH field value in L-SIG is a multiple of 3, a PHY-RXSTART.indication primitive is not issued. In both cases, the PHY should continue to detect the received signal using non-HT, HT, and VHT receive procedure.

PHY Receive Procedure of HE SU PPDU

If a valid parity bit and the RATE with MCS0 are indicated in L-SIG and RL-SIG and the LENGTH field value in L-SIG and RL-SIG meet the condition that the remainder is 1 after LENGTH divided by 3, the PHY entity should begin receiving the sequence of HE-SIG-A, HE-STF, and HE-LTF for HE SU PPDU and HE trigger-based. After RL-SIG, the PHY entity shall receive two symbols of HE-SIG-A immediately followed by HE-STF. The PHY entity shall check CRC of HE-SIG-A. If the CRC check is valid, the PHY entity shall report TXOP, BSS Color and check Format field, and continue to receive HE-STF. The PHY entity shall report to the MAC entity the predicted duration of the TXOP in HE-SIG-A. The PHY entity shall check the BSS color in HE-SIG-A. The PHY entity shall check Format field in HE-SIG-A.

If the Format field indicates an HE SU PPDU, the PHY entity receives HE-STF for 4 μs after HE-SIG-A.

The PHY entity maintains PHY-CCA.indication(BUSY, channel-list) primitive for the predicted duration of the transmitted PPDU, as defined by RXTIME in Equation 3, except when the HE-SIG-A indicates an invalid CRC or an invalid reserved HE-SIG-A indication. In which case, The PHY entity maintains PHY-CCA.indication(BUSY, channel-list) primitive for the predicted duration of the transmitted PPDU, as defined by the following equation based on LENGTH parameter.

$$RXTIME = \left\lceil \frac{LENGTH + 3}{3} \right\rceil \cdot 4 + 20 + SignalExtension \quad \text{[Equation 5]}$$

PHY Receive Procedure of HE TB PPDU

If a valid parity bit and the RATE with MCS0 are indicated in L-SIG and RL-SIG and the LENGTH field value in L-SIG and RL-SIG meet the condition that the remainder is 1 after LENGTH divided by 3, the PHY entity should begin receiving the sequence of HE-SIG-A, HE-STF, and HE-LTF for HE SU PPDU and HE trigger-based. After RL-SIG, the PHY entity shall receive two symbols of HE-SIG-A immediately followed by HE-STF. The PHY entity shall check CRC of HE-SIG-A. If the CRC check is valid, the PHY entity shall report TXOP, BSS Color and check Format field, and continue to receive HE-STF. The PHY entity shall report to the MAC entity the predicted duration of the TXOP in HE-SIG-A. The PHY entity shall check the BSS color in HE-SIG-A. The PHY entity shall check Format field in HE-SIG-A.

If the Format field indicates an HE TB PPDU, the PHY entity shall receive HE-STF for 8 μs after HE-SIG-A.

For calculating the predicted duration of the transmitted PPDU, as defined by RXTIME in Equation 3, the HE-SIG-A field of the HE TB PPDU includes at least one of the following subfields. The numbers of bits is exemplary purpose only.

TABLE 6

| Subfields | Bits | Description |
| --- | --- | --- |
| HE-LTF symbols | 3 | Indicates the number of HE-LTF symbols: Set to 0 for 1 HE-LTF symbol Set to 1 for 2 HE-LTF symbols Set to 2 for 4 HE-LTF symbols Set to 3 for 6 HE-LTF symbols Set to 4 for 8 HE-LTF symbols Other values are reserved. |
| GI/LTF Size | 3 | Indicates the GI duration and HE-LTF size. Set to 0 to indicate a 1x HE-LTF and 0.8 μs GI Set to 1 to indicate a 2x HE-LTF and 0.8 μs GI Set to 2 to indicate a 2x HE-LTF and 1.6 μ GI Set to 3 to indicate a 4x HE-LTF and 0.8 μs GI when both DCM in HE-SIGA1 and STBC in HE-SIGA2 are set to 1. Neither DCM nor STBC shall be applied when both DCM in HE-SIGA1 and STBC in HE-SIGA2 are set to 1. Set to 3 to indicate a 4x HE-LTF and 3.2 μs GI otherwise. |
| PE Disambiguity | 1 | Indicate PE Disambiguity |

However, the HE-SIG-A field of the HE TB PPDU does not have the above subfields. Only AP that transmitted a trigger frame before SIFS time can know the above subfields for the received HE TB PPDU. For solving this problem, the CCA indication procedure upon receiving the HE TB PPDU is proposed as follows.

Proposal 1)

The PHY entity of AP STA and non-AP STA may maintain PHY-CCA.indication(BUSY, channel-list) primitive for the predicted duration of the transmitted PPDU, as defined by the following equation based on LENGTH parameter.

$$RXTIME = \left\lceil \frac{LENGTH + 3}{3} \right\rceil \cdot 4 + 20 + SignalExtension \quad \text{[Equation 6]}$$

Proposal 2)

The PHY entity of AP STA that transmitted a trigger frame before SIFS time shall maintain PHY-CCA.indication (BUSY, channel-list) primitive for the predicted duration of the transmitted PPDU, as defined by RXTIME in Equation 3, except when the HE-SIG-A indicates an invalid CRC or an invalid reserved HE-SIG-A indication. In which case, The PHY entity shall maintain PHY-CCA.indication(BUSY, channel-list) primitive for the predicted duration of the transmitted PPDU, as defined by the equation 6.

Proposal 3)

The PHY entity of AP STA that transmitted a trigger frame before SIFS time and LENGTH parameter of the received HE TB PPDU is equal to the Length subfield of the Common Info field in the previously transmitted Trigger frame may maintain PHY-CCA.indication(BUSY, channel-list) primitive for the predicted duration of the transmitted PPDU, as defined by RXTIME in Equation 3, except when the HE-SIG-A indicates an invalid CRC or an invalid reserved HE-SIG-A indication. In which case, The PHY entity shall maintain PHY-CCA.indication(BUSY, channel-list) primitive for the predicted duration of the transmitted PPDU, as defined by the equation 6.

Proposal 4)

The PHY entity of AP STA that transmitted a trigger frame before SIFS time and LENGTH parameter of the received HE TB PPDU is not equal to the Length subfield of the Common Info field in the previously transmitted Trigger frame may maintain PHY-CCA.indication(BUSY, channel-list) primitive for the predicted duration of the transmitted PPDU (even though the HE-SIG-A indicates an valid CRC or an valid reserved HE-SIG-A indication), as defined by the equation 6.

Proposal 5)

The PHY entity of AP STA that did not transmit a trigger frame before SIFS time may maintain PHY-CCA.indication (BUSY, channel-list) primitive for the predicted duration of the transmitted PPDU (In other words, the received HE TB PPDU) (even though the HE-SIG-A indicates an valid CRC or an valid reserved HE-SIG-A indication), as defined by the equation 6.

Proposal 6)

The PHY entity of non-AP STA shall maintain PHY-CCA.indication(BUSY, channel-list) primitive for the predicted duration of the transmitted PPDU (In other words, the received HE TB PPDU) (even though the HE-SIG-A indicates an valid CRC or an valid reserved HE-SIG-A indication), as defined by the equation 6.

Proposal 7)

HE-SIG-A of HE trigger-based PPDU includes at least one subfield shown in Table 7.

TABLE 7

| Subfields | Bits | Description |
|---|---|---|
| HE-LTF symbols | 3 | Indicates the number of HE-LTF symbols: Set to 0 for 1 HE-LTF symbol Set to 1 for 2 HE-LTF symbols Set to 2 for 4 HE-LTF symbols Set to 3 for 6 HE-LTF symbols Set to 4 for 8 HE-LTF symbols Other values are reserved. |
| GI/LTF Size | 3 | Indicates the GI duration and HE-LTF size. Set to 0 to indicate a 1x HE-LTF and 0.8 µs GI Set to 1 to indicate a 2x HE-LTF and 0.8 µs GI Set to 2 to indicate a 2x HE-LTF and 1.6 µs GI Set to 3 to indicate a 4x HE-LTF and 0.8 µs GI when both DCM in HE-SIGA1 and STBC in HE-SIGA2 are set to 1. Neither DCM nor STBC shall be applied when both DCM in HE-SIGA1 and STBC in HE-SIGA2 are set to 1. Set to 3 to indicate a 4x HE-LTF and 3.2 µs GI otherwise. |
| PE Disambiguity | 1 | Indicate PE Disambiguity |
| STBC | 1 | In an HE MU PPDU where each RU includes no more than 1 user, set to 1 to indicate all RUs are STBC encoded in the payload, set to 0 to indicate all RUs are not STBC encoded in the payload. STBC is not applied in MU-MIMO RUs. |
| DCM | 1 | Indicates whether or not DCM is applied to the Data field for the MCS indicated. Set to 1 to indicate that DCM is applied to the Data field Set to 0 to indicate that DCM is not applhed to the Data field. DCM is only applied for MCS0, MCS1, MCS3 and MCS4. DCM is only applied for 1 and 2 spatial streams. DCM is not applied when STBC is used. |

Then, the PHY entity may maintain PHY-CCA.indication (BUSY, channel-list) primitive for the predicted duration of the transmitted PPDU, as defined by RXTIME in Equation 3, except when the HE-SIG-A indicates an invalid CRC or an invalid reserved HE-SIG-A indication. In which case, The PHY entity shall maintain PHY-CCA.indication(BUSY, channel-list) primitive for the predicted duration of the transmitted PPDU, as defined by the equation 6.

PHY Receive Procedure of HE ER SU PPDU

If a valid parity bit of L-SIG and RL-SIG is indicated and the LENGTH field value in L-SIG and RL-SIG meet the condition that the remainder is 2 after LENGTH divided by 3, the PHY entity should detect the signal constellations in the second symbol after RL-SIG. If the constellation is QBPSK, the PHY entity shall continue receiving the sequence of HE-SIG-A, HE-STF, and HE-LTF for HE ER SU PPDU. After RL-SIG, the PHY entity shall receive four symbols of HE-SIG-A immediately followed by HE-STF. The PHY entity shall check CRC of HE-SIG-A. If the CRC check is valid, the PHY entity shall report TXOP, BSS Color, and continue to receive HE-STF. The PHY entity shall report to the MAC entity the predicted duration of the TXOP in HE-SIG-A. The PHY entity shall check the BSS color in HE-SIG-A. If the BSS color doesn't contain an intended value, the PHY entity shall set PHY_RXSTART.indication (RXVECTOR) then set PHY_RXEND.indication(Filtered). The PHY entity shall receive HE-STF for 4 µs after HE-SIG-A.

The PHY entity shall maintain PHY-CCA.indication (BUSY, channel-list) primitive for the predicted duration of the transmitted PPDU, as defined by RXTIME in Equation 3, except when the HE-SIG-A indicates an invalid CRC or an invalid reserved HE-SIG-A indication. In which case, The PHY entity shall maintain PHY-CCA.indication(BUSY, channel-list) primitive for the predicted duration of the transmitted PPDU, as defined by the equation 6.

PHY Receive Procedure of HE MU PPDU

If a valid parity bit of L-SIG and RL-SIG is indicated and the LENGTH field value in L-SIG and RL-SIG meet the condition that the remainder is 2 after LENGTH divided by 3, the PHY entity should detect the signal constellations in the second symbol after RL-SIG. If the constellation is BPSK, the PHY entity shall continue receiving the sequence of HE-SIG-A, HE-SIG-B, HE-STF, and HE-LTF for HE MU PPDU. After RL-SIG, the PHY entity shall receive two symbols of HE-SIG-A immediately followed by HE-SIG-B. The PHY entity shall check CRC of HE-SIG-A. If the CRC check is valid, the PHY entity shall report TXOP, BSS Color, and continue to receive HE-SIG-B. The PHY entity shall report to the MAC entity the predicted duration of the TXOP in HE-SIG-A. The PHY entity shall check the BSS color in HE-SIG-A. If the BSS color doesn't contain an intended value, the PHY entity shall set PHY_RXSTART.indication (RXVECTOR) then set PHY_RXEND.indication(Filtered). After HE-SIG-A, the PHY entity shall receive HE-SIG-B for the number of symbols predicted from HE-SIG-A. If the common field presents in HE-SIG-B, the PHY entity shall check the CRC of the common field. If the CRC in the common field is valid or the common field is not present, the PHY entity shall search for intended STA-ID in each user-specific subfield with a valid CRC. If no CRC is valid or no intended STA-ID is detected, the PHY entity shall set PHY_RXSTART.indication(RXVECTOR) then set PHY-_RXEND.indication(Filtered). If a complete allocation of an intended STA-ID is detected in block with valid CRC, the PHY entity shall continue receiving HE-STF for 4 µs after HE-SIG-B for the detected and intended STA.

The PHY entity shall maintain PHY-CCA.indication (BUSY, channel-list) primitive for the predicted duration of the transmitted PPDU, as defined by RXTIME in Equation 3, except when the HE-SIG-A indicates an invalid CRC or an invalid reserved HE-SIG-A indication. In which case, The PHY entity shall maintain PHY-CCA.indication(BUSY, channel-list) primitive for the predicted duration of the transmitted PPDU, as defined by the equation 6.

TXOP Duration

For HE SU PPDU, HE extended range SU PPDU, HE TB PPDU and HE MU PPDU, the received PSDU bits are assembled into octets, decoded, and present to the MAC using a series of PHY-DATAIndication(DATA) primitive exchanges. Any final bits that cannot be assembled into a complete octet are considered pad bits and discarded. After the reception of the final bit of the last PSDU octet, and possible padding and tail bits, the PHY entity shall check whether packet extension and/or signal extension is applied. If packet extension and/or signal extension is applied, the PHY entity shall wait until the packet extension and/or signal extension expires before returning to the RX IDLE state.

TXOP Duration field is carried in the TXVECTOR parameter TXOP_DURATION of an HE PPDU and indicates duration information for NAV setting and protection of TXOP.

A STA that transmits an HE SU PPDU, HE ER SU PPDU, or HE MU PPDU may indicate no duration information for NAV setting by setting the TXVECTOR parameter TXOP_DURATION to all 1s.

If a STA transmits an HE SU PPDU, HE ER PPDU, or HE MU PPDU that carries a PS-Poll frame, the STA shall set the TXVECTOR parameter TXOP_DURATION to all 1s.

A TXOP responder that transmits an HE TB PPDU shall set the TXVECTOR parameter TXOP_DURATION to all 1s if the RXVECTOR parameter TXOP_DURATION of the soliciting PPDU is set to all 1s.

A TXOP responder that transmits an HE TB PPDU shall not set the TXVECTOR parameter TXOP_DURATION to all 1s if any one of the following conditions is met:
  The RXVECTOR parameter TXOP_DURATION of the soliciting PPDU is not set to all 1s
  The RXVECTOR parameter FORMAT of the soliciting PPDU is not equal to HE_SU, HE_MU, or HE_EXT_SU If the TXVECTOR parameter TXOP_DURATION of an HE PPDU is not set to all 1s, and there exists Duration field in the MAC header of the HE PPDU, the duration information indicated by the TXVECTOR parameter TXOP_DU-RATION is determined based on the duration information indicated by the Duration field in the MAC header (see the below Equation 7 or Equation 8) and shall indicate the largest feasible duration information that is smaller than or equal to the duration information indicated by the Duration field. Except for a PS-Poll frame and an HE NDP PPDU, the Duration/ID field in a data frame, management frame and control frame indicates duration information. For a TXOP responder, the Duration field in the MAC header of the response PPDU is set based on the Duration field in the MAC header of the soliciting PPDU.

$$\text{TXOP\_DURATION} = \max\left\{\min\left(8\left\lfloor\frac{D}{8}\right\rfloor, 504\right), 128\left\lfloor\frac{D}{128}\right\rfloor\right\} \quad \text{[Equation 7]}$$

where D represents the value of the Duration field in the MAC header of the transmitting HE PPDU.

$$\text{TXOP\_DURATION} = \max\left\{\min\left(8\left\lfloor\frac{D}{8}\right\rfloor, 504\right), \min\left(128\left\lfloor\frac{D}{128}\right\rfloor, 8448\right)\right\} \quad \text{[Equation 8]}$$

For a TXOP responder that transmits an HE TB PPDU carrying either a PS-Poll frame or an HE NDP, if the TXOP responder does not set the TXVECTOR parameter TXOP_DURATION of the HE TB PPDU to all 1s, the TXOP responder first calculates potential duration information equal to the duration information indicated by the Duration field of the frame that solicits the response minus the time, in microseconds, between the end of the PPDU carrying the frame that soliciting the HE TB PPDU and the end of the HE TB PPDU.

The time, in microseconds, between the end of the PPDU carrying the frame that soliciting the HE TB PPDU and the end of the HE TB PPDU carrying either a PS-Poll frame or an HE NDP is defined by the following equation.

$$SIFS + \left\lceil\frac{LENGTH + 3}{3}\right\rceil \cdot 4 + 20 + SignalExtension \quad \text{[Equation 9]}$$

where SIFS is 10 μs when operating in the 2.4 GHz band and is 16 μs when operating in the 5 GHz band. LENGTH is the value of the Length subfield of the Common Info field in the Trigger frame in the soliciting PPDU. LENGTH may be equivalent to LENGTH parameter carried in the HE TB PPDU.

If the calculated potential duration information includes a fractional microsecond, the potential duration information is rounded up to the next higher integer. Then the duration information indicated by the TXVECTOR parameter TXOP_DURATION is determined based on the calculated potential duration information (see the below Equation 10 or Equation 11) and shall indicate the largest feasible duration information that is smaller than or equal to the calculated potential duration information.

$$\text{TXOP\_DURATION} = \max\left\{\min\left(8\left\lfloor\frac{D'}{8}\right\rfloor, 504\right), 128\left\lfloor\frac{D'}{128}\right\rfloor\right\} \quad \text{[Equation 10]}$$

where D' represents the calculated potential duration.

$$\text{TXOP\_DURATION} = \max\left\{\min\left(8\left\lfloor\frac{D'}{8}\right\rfloor, 504\right), \min\left(128\left\lfloor\frac{D'}{128}\right\rfloor, 8448\right)\right\} \quad \text{[Equation 11]}$$

For a TXOP holder that transmits an HE NDP PPDU, if the TXOP holder does not set the TXVECTOR parameter TXOP_DURATION of the HE NDP PPDU to all 1s, the TXOP holder first calculates potential duration information equal to the duration information indicated by the Duration field of the preceding HE NDP Announcement frame minus the time, in microseconds, between the end of the PPDU carrying the HE NDP Announcement frame and the end of the HE NDP PPDU.

The time, in microseconds, between the end of the PPDU carrying the HE NDP Announcement frame and the end of the HE NDP PPDU is defined by SIFS+TXTIME, where TXTIME=20+$T_{HE-PREAMBLE}$+$T_{PE}$+SignalExtension.

If the calculated potential duration information includes a fractional microsecond, the potential duration information is rounded up to the next higher integer. Then the duration information indicated by the TXVECTOR parameter TXOP_DURATION is determined based on the calculated potential duration information (see the Equation 12 or Equation 13) and shall indicate the largest feasible duration information that is smaller than or equal to the calculated potential duration information.

$$\text{TXOP\_DURATION} = \max\left\{\min\left(8\left\lceil\frac{D'}{8}\right\rceil, 504\right), 128\left\lfloor\frac{D'}{128}\right\rfloor\right\} \quad \text{[Equation 12]}$$

where D' represents the calculated potential duration.

$$\text{TXOP\_DURATION} = \quad \text{[Equation 13]}$$
$$\max\left\{\min\left(8\left\lceil\frac{D'}{8}\right\rceil, 504\right), \min\left(128\left\lfloor\frac{D'}{128}\right\rfloor, 8448\right)\right\}$$

When the Duration field in the MAC header of the HE NDP Announcement frame is set to $D_N$, TXOP_DURATION can be calculated as Equations 13-16.

$$\text{TXOP\_DURATION} = \quad \text{[Equation 13]}$$
$$\max\left\{\min\left(8\left\lceil\frac{\lceil D_N - SIFS - TXTIME\rceil}{8}\right\rceil, 504\right),\right.$$
$$\left.128\left\lfloor\frac{\lceil D_N - SIFS - TXTIME\rceil}{128}\right\rfloor\right\}$$

$$\text{TXOP\_DURATION} = \quad \text{[Equation 14]}$$
$$\max\left\{\min\left(8\left\lceil\frac{D_N - SIFS - \lfloor TXTIME\rfloor}{8}\right\rceil, 504\right),\right.$$
$$\left.128\left\lfloor\frac{D_N - SIFS - \lfloor TXTIME\rfloor}{128}\right\rfloor\right\}$$

$$\text{TXOP\_DURATION} = \quad \text{[Equation 15]}$$
$$\max\left\{\min\left(8\left\lceil\frac{\lceil D_N - SIFS - TXTIME\rceil}{8}\right\rceil, 504\right),\right.$$
$$\left.128\left\lfloor\frac{\lceil D_N - SIFS - TXTIME\rceil}{128}\right\rfloor, 8448\right)\right\}$$

$$\text{TXOP\_DURATION} = \quad \text{[Equation 16]}$$
$$\max\left\{\min\left(8\left\lceil\frac{D_N - SIFS - \lfloor TXTIME\rfloor}{8}\right\rceil, 504\right),\right.$$
$$\left.128\left\lfloor\frac{D_N - SIFS - \lfloor TXTIME\rfloor}{128}\right\rfloor, 8448\right)\right\}$$

Here, TXTIME=20+$T_{HE-PREAMBLE}$+$T_{PE}$+SignalExtension.

For the HE TB PPDU, when TXOP responders calculate the Duration field in the MAC header of the HE trigger-based PPDU, all TXOP responders shall have an identical calculated value. If TXOP responders have different values (i.e., the Duration field in the MAC header of the HE TB PPDU), the TXVECTOR parameter TXOP_DURATION values of the HE TB PPDUs transmitted from TXOP responders can also have different values. In such case, 3rd party STA can't decode the TXOP Duration field carried in the TXVECTOR parameter TXOP_DURATION of an HE TB PPDU.

In order to solve this problem, the following mechanism is proposed to calculate the Duration field in the MAC header of the HE TB PPDU.

Proposal 1)

In HE SU PPDU, HE ER SU PPDU, HE TB PPDU and HE MU PPDU transmitted by a STA (i.e., TXOP responder) that is not the TXOP holder, the Duration/ID field is set to the value obtained from the Duration/ID field of the frame that elicited the response minus the time, in microseconds, between the end of the PPDU carrying the frame that elicited the response and the end of the PPDU carrying the frame. The time, in microseconds, between the end of the PPDU carrying the frame that elicited the response and the end of the PPDU carrying the frame is defined by SIFS+TXTIME, where TXTIME is defined in Equation 2.

Figure 10:
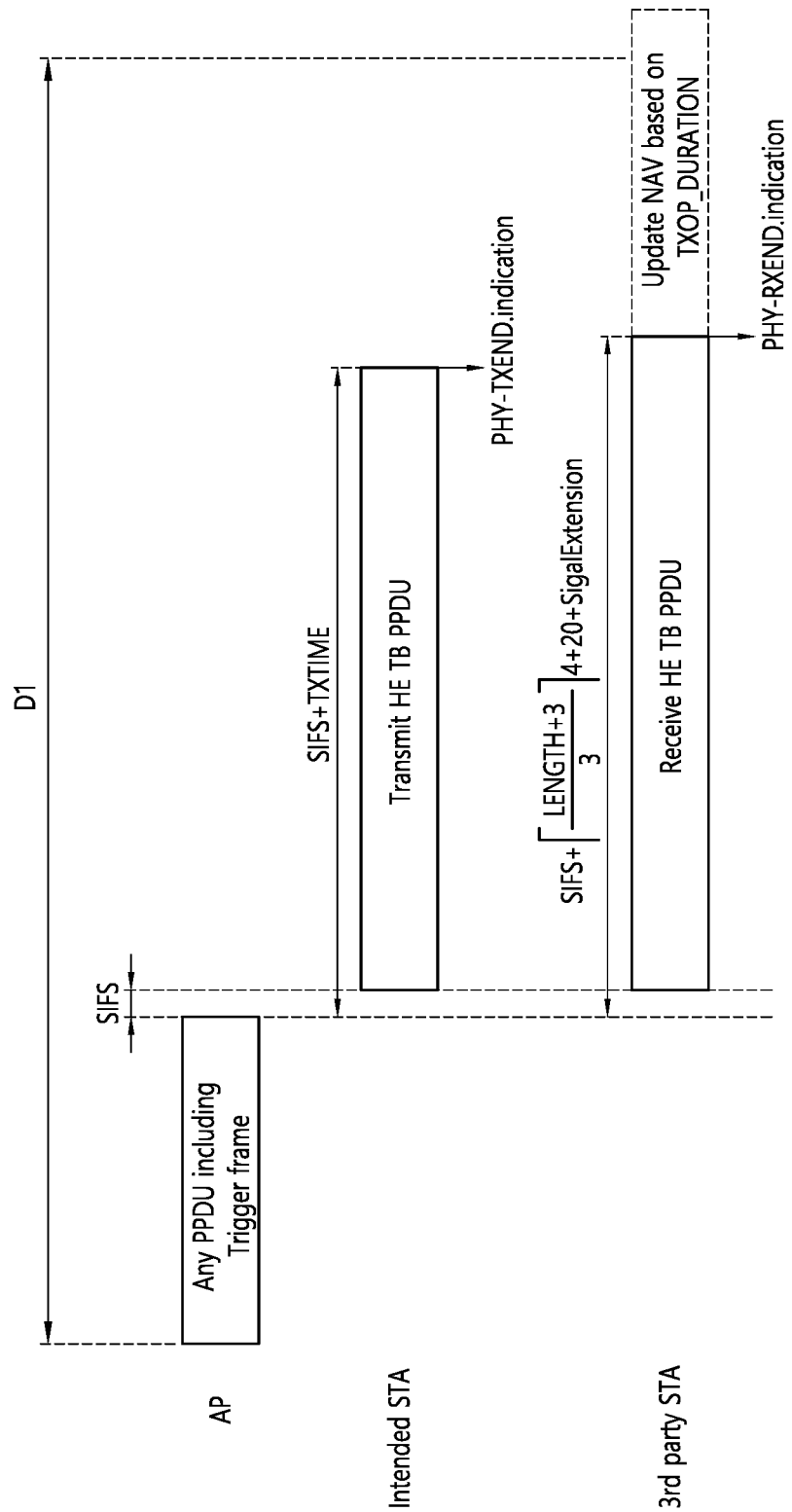
FIG. 10 shows an example of the Duration field in the HE TB PPDU.

FIG. 10 shows an example of the Duration field in the HE TB PPDU.

D1 denotes the value obtained from the Duration field in the MAC header carried in any PPDU including Trigger frame. The Duration field in the MAC header carried in HE TB PPDU may be set to D1−(SIFS+TXTIME).

An issue of this proposal 1 is that 3rd party STA's NAV time updated based on the TXOP_DURATION can exceed the remaining TXOP duration. Because the NAV update timing that is occurred at PHY-RXEND.indication primitive is not same with the end of the HE TB PPDU transmission.

Figure 11:
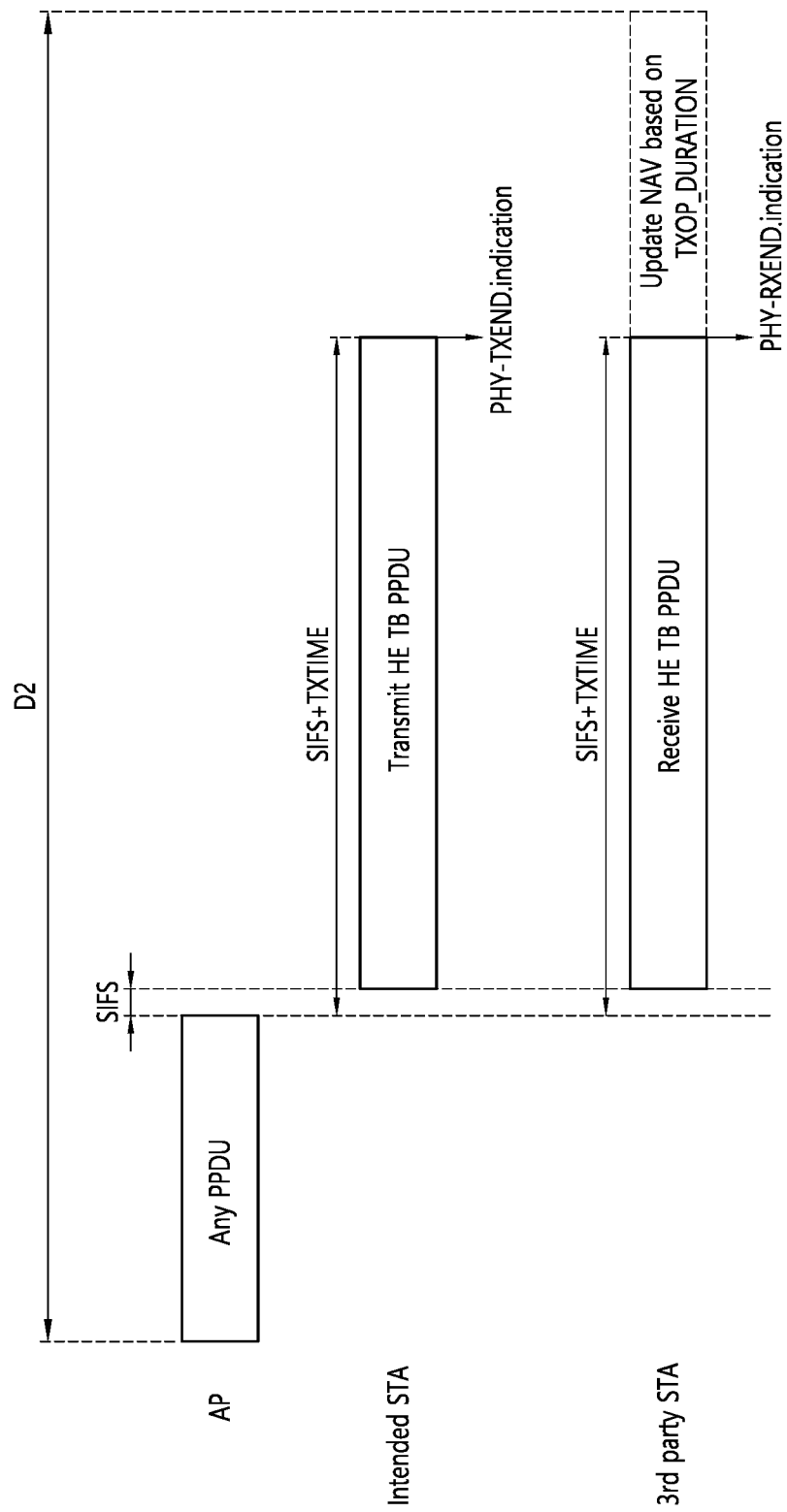
FIG. 11 shows an example of the Duration field in the HE SU PPDU, HE ER SU PPDU and HE MU PPDU.

FIG. 11 shows an example of the Duration field in the HE SU PPDU, HE ER SU PPDU and HE MU PPDU.

D2 denotes the value obtained from the Duration field in the MAC header carried in any PPDU. The Duration field in the MAC header carried in HE TB PPDU may be set to D2−(SIFS+TXTIME).

In case of the HE SU PPDU, HE ER SU PPDU and HE MU PPDU, the issue happened in the HE TB PPDU is not occurred. Because the NAV update timing that is occurred at PHY-RXEND.indication primitive is same with the end of the HE SU PPDU transmission.

Proposal 2)

This proposal is to solve the issue of the proposal 1. In an HE TB PPDU transmitted by a STA (i.e., TXOP responder) that is not the TXOP holder, the Duration/ID field is set to the value obtained from the Duration/ID field of the frame that elicited the response minus the time, in microseconds, between the end of the PPDU carrying the frame that elicited the response and the end of the PPDU carrying the frame. The time, in microseconds, between the end of the PPDU carrying the frame (i.e., Trigger frame) that elicited the response and the end of the PPDU (i.e., HE TB PPDU) carrying the frame is defined by the following equation.

$$SIFS + \left\lceil\frac{LENGTH + 3}{3}\right\rceil \cdot 4 + 20 + SignalExtension \quad \text{[Equation 17]}$$

where LENGTH is the value obtained from the Length subfield of the Common Info field in the Trigger frame in the soliciting PPDU. Also, LENGTH is equivalent to LENGTH parameter carried in the HE TB PPDU.

Meanwhile, when a TXOP responder transmits other HE PPDUs (such as, HE SU PPDU, HE ER SU PPDU and HE MU PPDU), it calculates the Duration field in the MAC header as the following.

In HE SU PPDU, HE ER SU PPDU and HE MU PPDU transmitted by a STA (i.e., TXOP responder) that is not the TXOP holder, the Duration/ID field is set to the value obtained from the Duration/ID field of the frame that elicited the response minus the time, in microseconds, between the end of the PPDU carrying the frame that elicited the response and the end of the PPDU carrying the frame. The time, in microseconds, between the end of the PPDU carrying the frame that elicited the response and the end of the PPDU carrying the frame is defined by SIFS+TXTIME, where TXTIME is defined in Equation 2.

Figure 12:
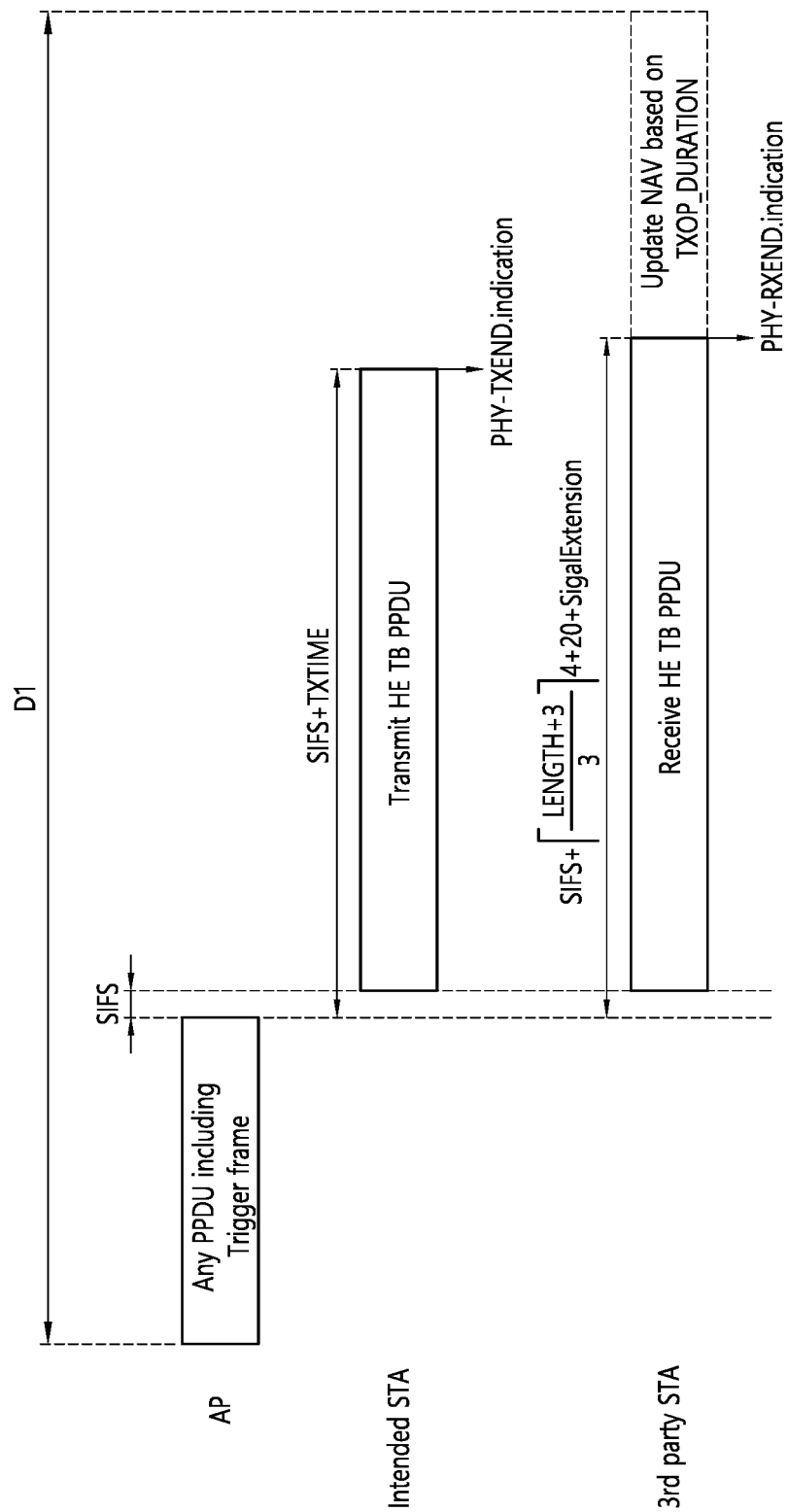
FIG. 12 shows an example of the Duration field in the HE TB PPDU.

FIG. 12 shows an example of the Duration field in the HE TB PPDU.

D1 denotes the value obtained from the Duration field in the MAC header carried in any PPDU including Trigger frame. The Duration field in the MAC header carried in HE TB PPDU is set to:

$$D1 - \left\{ SIFS + \left\lceil \frac{LENGTH + 3}{3} \right\rceil \cdot 4 + 20 + SignalExtension \right\} \quad \text{[Equation 18]}$$

where LENGTH is the value obtained from the Length subfield of the Common Info field in the Trigger frame in the soliciting PPDU.

Figure 13:
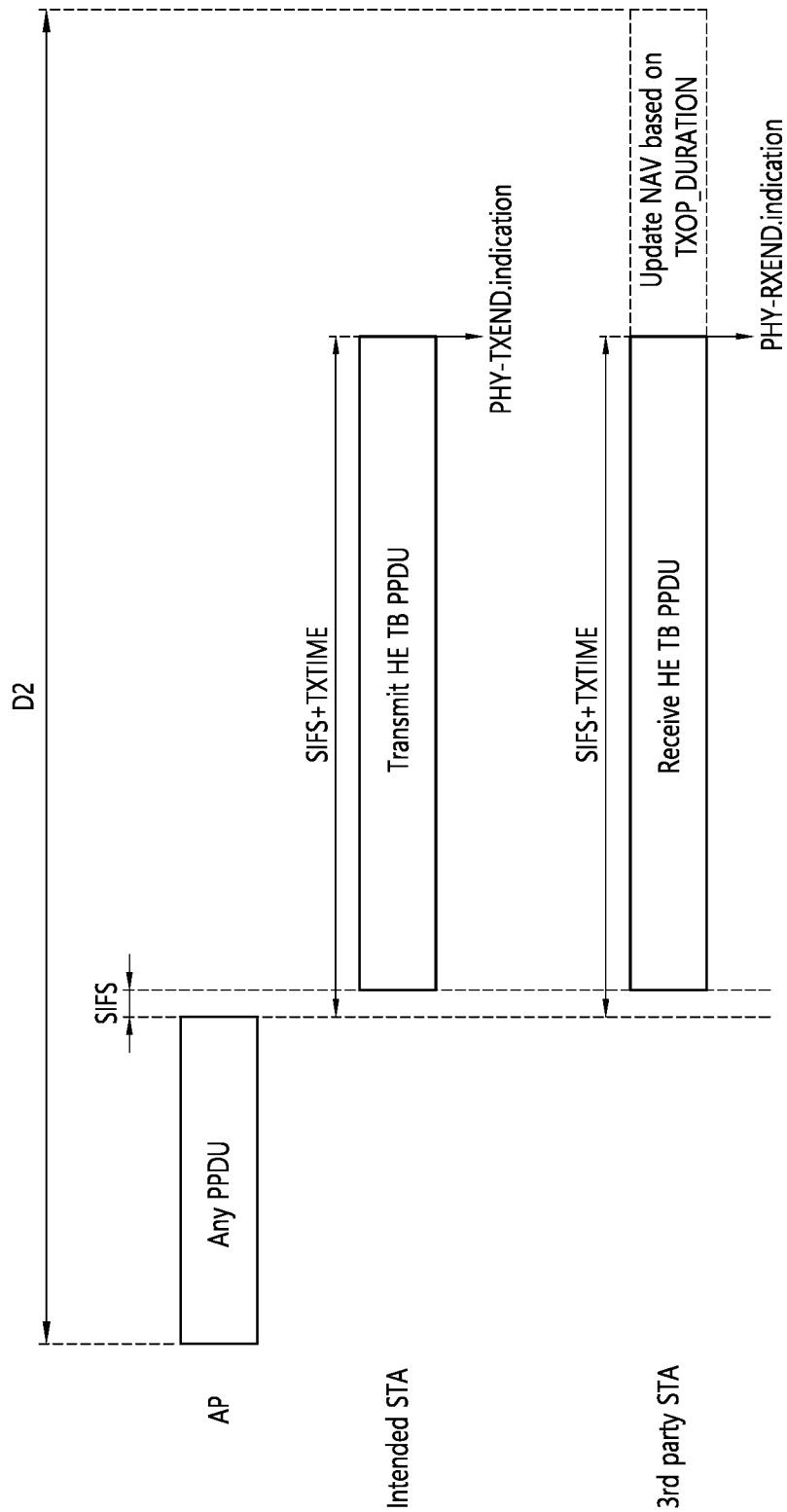
FIG. 13 shows an example of the Duration field in the HE SU PPDU, HE ER SU PPDU and HE MU PPDU.

FIG. 13 shows an example of the Duration field in the HE SU PPDU, HE ER SU PPDU and HE MU PPDU.

D2 denotes the value obtained from the Duration field in the MAC header carried in any PPDU. The Duration field in the MAC header carried in HE TB PPDU is set to D2−(SIFS+TXTIME).

Virtual Carrier Sense Mechanism

An HE non-AP STA maintains two NAV timers. An HE AP STA may maintain two NAV timers.

For the two NAVs maintained by an HE STA, one is identified as intra-BSS NAV, and the second one is identified as basic NAV. Intra-BSS NAV is used to store NAV value, if needed, from a PPDU identified as intra-BSS. Basic NAV is used to store NAV value, if needed, from a PPDU identified as inter-BSS or cannot be identified as intra-BSS or inter-BSS.

A frame received by the STA is an intra-BSS frame if one of the following conditions is true:

The RXVECTOR parameter BSS_COLOR in the received PPDU carrying the frame is the same as the BSS color announced by the AP to which the STA is associated The RA field, TA field or BSSID field of the received frame with the Individual/Group bit forced to the value 0 is the same as the BSSID of AP to which the STA is associated The AP to which the STA is associated is a member of a Multiple BSSID Set with two or more members and the RA field, TA field or BSSID field of the received frame with the Individual/Group bit forced to the value 0 is same as the BSSID of any member of the Multiple BSSID Set The RXVECTOR parameter PARTIAL_AID in the received VHT PPDU with the RXVECTOR parameter GROUP_ID equal to 0 is the same as the BSSID[39:47] of the AP to which the STA is associated The value of RXVECTOR parameter PARTIAL_AID [5:8] in the received VHT PPDU with the RXVECTOR parameter GROUP_ID equal to 63 is the same as the partial BSS color announced by the AP to which the STA is associated when the Partial BSS Color field in the most recently received HE Operation element is 1.

The frame is a control frame that does not have a TA field and the RA matches the saved TXOP holder address for the BSS to which it is associated.

A frame received by the STA is an inter-BSS frame if one of the following conditions is true:

The RXVECTOR parameter BSS_COLOR of the PPDU carrying the frame is not 0 and does not match the BSS color announced by the HE AP to which the STA is associated.

The RXVECTOR parameter BSS_COLOR of the PPDU carrying the frame is present and the STA is associated to the legacy AP.

When the RXVECTOR parameter BSS_COLOR of the PPDU carrying the frame is not present, the BSSID field of the received frame with Individual/Group bit forced to the value 0, if available, does not match the BSSID of AP to which the STA is associated or if the BSSID field is not available, both the RA and TA fields exist, and none of the address fields of the received frame with Individual/Group bit forced to the value 0 match the BSSID of AP to which the STA is associated The AP to which the STA is associated is a member of a Multiple BSSID Set with two or more members and the BSSID field of the received frame with Individual/Group bit forced to the value 0, if available, does not match the BSSID of any member of the Multiple BSSID Set If the AP to which the STA is associated is a member of a Multiple BSSID Set with two or more members, the BSSID field is not available, both the RA and TA fields exist, and none of the address fields of the received frame with the Individual/Group bit forced to the value 0 match the BSSID of any member of the Multiple BSSID Set The RXVECTOR parameter PARTIAL_AID of the received VHT PPDU frame with the RXVECTOR parameter GROUP_ID equal to 0 is different from the BSSID[39:47] of the AP to which the STA is associated The value of RXVECTOR parameter PARTIAL_AID [5:8] in the received VHT PPDU with the RXVECTOR parameter GROUP_ID equal to 63 is different from the partial BSS color announced by the AP to which the STA is associated when the Partial BSS Color field in the most recently received HE Operation element is 1.

An HE AP receives either a VHT MU PPDU or an HE MU PPDU.

If the received frame satisfies both intra-BSS and inter-BSS conditions, the decision made by using the MAC address takes precedence over the decision made by using the RXVECTOR parameter BSS_COLOR.

If the received frame does not satisfy any of the intra-BSS and inter-BSS conditions, then the frame cannot be determined as intra-BSS or inter-BSS frame.

For an HE STA maintaining two NAVs (i.e., intra-BSS NAV and basic NAV), if both the NAV timers are 0, the virtual CS indication is that the medium is idle; if one of the two NAV timers is nonzero, the virtual CS indication is that the medium is busy except for a TXOP responder. The TXOP responder considers only the basic NAV for the virtual CS indication. For example, when the TXOP responder receives a RTS frame or a Trigger frame, the virtual CS indication that is considered in the CTS and HE trigger-based PPDU response is that the medium is idle if the basic NAV is 0 regardless of an intra-BSS NAV.

Figure 14:
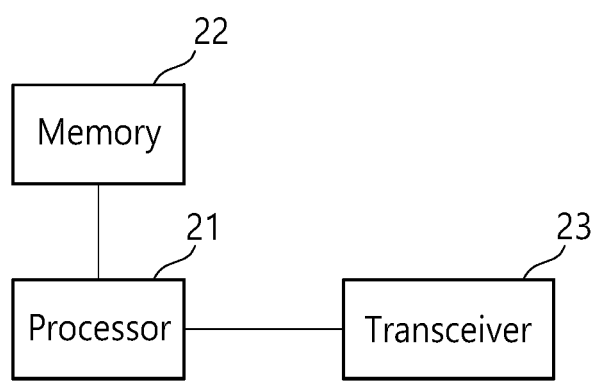
FIG. 14 shows a block diagram of a device to implement embodiments of the present invention.

FIG. 14 shows a block diagram of a device to implement embodiments of the present invention.

A device may include a processor 21, a memory 22, and a transceiver 23. The processor 21 implements an operation of the STA according to the embodiment of the present invention. The processor 21 may generate a PPDU according to an embodiment of the present invention and may instruct the transceiver 23 to transmit the PPDU. The memory 22 stores instructions for the operation of the processor 21. The stored instructions may be executed by the processor 21 and may be implemented to perform the aforementioned operation of the STA. The transceiver 23 transmits and receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for use in a station for transmitting a physical layer protocol data unit (PPDU), the method comprising:
    receiving, from an access point (AP), a trigger frame, wherein the trigger frame includes a first duration field, a length field and a resource allocation field, the resource allocation field indicating a resource allocated for transmission of a high efficiency (HE) trigger-based (TB) PPDU; and
    transmitting, to the AP, the HE TB PPDU in response to the received trigger frame,
    wherein the HE TB PPDU includes a second duration field,
    wherein a value of the second duration field is set based on a value obtained from the first duration field of the trigger frame minus a Short Interframe Space (SIFS) duration and a duration of the HE TB PPDU.

2. The method of claim 1, wherein the duration of the HE TB PPDU is based on a value of the length field of the received trigger frame and a SignalExtension value.

3. The method of claim 1, wherein the HE TB PPDU further includes a legacy signal field and a data field, wherein the legacy signal field represents a number of orthogonal frequency division multiplexing (OFDM) symbols used for the data field, and wherein the legacy signal field indicates the value of the length field in the trigger frame.

4. The method of claim 1, wherein the SIFS duration is 10 μs when the station operates in a 2.4 GHz band and the SIFs duration is 16 μs when the station operates in a 5 GHz band.

5. The method of claim 1, wherein the trigger frame further includes an association identifier field associated with the station.

6. The method of claim 1, further comprising updating a network allocation vector (NAV) based on the first and second duration fields.

7. The method of claim 1, wherein the first duration field is included in a medium access control (MAC) header of the trigger frame.

8. The method of claim 7, wherein the second duration field is included in a MAC header of the HE TB PPDU.

9. The method of claim 1, wherein the HE TB PPDU further includes a third duration field, wherein the third duration field is set based on a value obtained from the first duration field of the trigger frame minus the time equal to SIFS plus a duration of the HE TB PPDU in a unit of 8 μs or 128 μs.

10. The method of claim 9, wherein the third duration field is included in a physical layer preamble of the HE TB PPDU.

11. The method of claim 1, wherein the HE TB PPDU is a multi-user (MU) transmission that is transmitted at a same time as another HE TB PPDU transmitted from another station.

12. A device for transmitting a physical layer protocol data unit (PPDU) in a wireless local area network, the device comprising:
    a transceiver configured to receive and transmit radio signals from an access point (AP); and
    a processor coupled with the transceiver and configured to:
    receive, from an access point (AP), a trigger frame, wherein the trigger frame includes a first duration field, a length field and a resource allocation field, the resource allocation field indicating a resource allocated for transmission of a high efficiency (HE) trigger-based (TB) PPDU; and
    transmit, to the AP, the HE TB PPDU in response to the received trigger frame,
    wherein the HE TB PPDU includes a second duration field,
    wherein a value of the second duration field is set based on a value obtained from the first duration field of the trigger frame minus a Short Interframe Space (SIFS) duration and a duration of the HE TB PPDU.

13. The device of claim 12, wherein the duration of the HE TB PPDU is based on a value of the length field of the received trigger frame and a SignalExtension value.

14. The device of claim 12, wherein the HE TB PPDU further includes a legacy signal field and a data field, wherein the legacy signal field represents a number of orthogonal frequency division multiplexing (OFDM) symbols used for the data field, and wherein the legacy signal field indicates the value of the length field in the trigger frame.

15. The device of claim 12, wherein the SIFS duration is 10 μs when the station operates in a 2.4 GHz band and the SIFs duration is 16 μs when the station operates in a 5 GHz band.

16. The device of claim 12, wherein the trigger frame further includes an association identifier field associated with the station.

17. The device of claim 12, wherein the processor is further configured to update a network allocation vector (NAV) based on the first and second duration fields.

18. The device of claim 12, wherein the first duration field is included in a medium access control (MAC) header of the trigger frame.

19. The device of claim 18, wherein the second duration field is included in a MAC header of the HE TB PPDU.

20. The device of claim 12, wherein the HE TB PPDU further includes a third duration field, wherein the third duration field is set based on a value obtained from the first duration field of the trigger frame minus the time equal to SIFS plus a duration of the HE TB PPDU in a unit of 8 μs or 128 μs.

21. The device of claim 20, wherein the third duration field is included in a physical layer preamble of the HE TB PPDU.

22. The device of claim 12, wherein the HE TB PPDU is a multi-user (MU) transmission that is transmitted at a same time as another HE TB PPDU transmitted from another station.

* * * * *